(12) United States Patent
Sakakibara et al.

(10) Patent No.: US 12,235,877 B2
(45) Date of Patent: Feb. 25, 2025

(54) INFORMATION PROCESSING SYSTEM, INFORMATION PROCESSING METHOD, AND PROGRAM

(71) Applicant: Datascientist Inc., Tokyo (JP)

(72) Inventors: Naoya Sakakibara, Tokyo (JP); Yuki Hirobe, Tokyo (JP)

(73) Assignee: Datascientist Inc., Tokyo (JP)

( * ) Notice: Subject to any disclaimer, the term of this patent is extended or adjusted under 35 U.S.C. 154(b) by 0 days.

(21) Appl. No.: 18/258,068

(22) PCT Filed: Jul. 26, 2021

(86) PCT No.: PCT/JP2021/027598
§ 371 (c)(1),
(2) Date: Jun. 16, 2023

(87) PCT Pub. No.: WO2023/007561
PCT Pub. Date: Feb. 2, 2023

(65) Prior Publication Data
US 2024/0004905 A1    Jan. 4, 2024

(51) Int. Cl.
*G06F 16/31*    (2019.01)
*G06F 16/9538*    (2019.01)
*G06F 40/279*    (2020.01)

(52) U.S. Cl.
CPC ........ *G06F 16/313* (2019.01); *G06F 16/9538* (2019.01); *G06F 40/279* (2020.01)

(58) Field of Classification Search
CPC ... G06F 16/313; G06F 16/9538; G06F 40/279
See application file for complete search history.

(56) References Cited

U.S. PATENT DOCUMENTS

| 6,654,742 | B1 | 11/2003 | Kobayashi et al. |
| 9,460,217 | B2 * | 10/2016 | Nijjer ................ G06F 16/24578 |
| 2009/0063464 | A1 * | 3/2009 | Chang ................... G06F 16/951 |
| | | | 707/999.005 |

(Continued)

FOREIGN PATENT DOCUMENTS

| JP | 2000-242647 A | 9/2000 |
| JP | 2005-010899 A | 1/2005 |

(Continued)

OTHER PUBLICATIONS

International Search Report issued in PCT/JP2021/027598; mailed Oct. 19, 2021.

(Continued)

*Primary Examiner* — Diedra McQuitery
*Assistant Examiner* — Faezeh Forouharnejad
(74) *Attorney, Agent, or Firm* — Studebaker & Brackett PC

(57) ABSTRACT

Extraction means and output means are included, the extracting means extracting one group of words of interest of a group of first words of interest, a group of second words of interest, and a group of third words of interest in accordance with a first evaluation score, a second evaluation score, and a third evaluation score for each of morphemes contained in character data that is posted on each of web pages included in a result of a search that has been conducted by a search engine by using a search query, the output means outputting data for displaying at least the extracted group of words of interest.

22 Claims, 18 Drawing Sheets

(56) References Cited

U.S. PATENT DOCUMENTS

2018/0253480 A1* 9/2018 Zhu .................... G06F 3/04855

FOREIGN PATENT DOCUMENTS

| JP | 2005346598 A | * | 12/2005 |
| JP | 2012-073877 A | | 4/2012 |
| JP | 6164436 B1 | * | 7/2017 |

OTHER PUBLICATIONS

Written Opinion of the International Searching Authority issued in PCT/JP2021/027598; mailed Oct. 19, 2021.
Office Action issued in JP 2023-511770; mailed by the Japanese Patent Office on May 16, 2023.

* cited by examiner

FIG.4

| | 1ST RANK | 2ND RANK | ... | N-TH RANK | ... | M-TH RANK | (M+1)TH RANK | ... | (M+N)TH RANK |
|---|---|---|---|---|---|---|---|---|---|
| $m_1$ | $c_{11}$ | $c_{12}$ | ... | $c_{1N}$ | ... | $c_{1M}$ | $c_{1M+1}$ | ... | $c_{1M+N}$ |
| $m_2$ | | | | | | | | | |
| ... | | | | | | | | | |
| $m_i$ | $c_{i1}$ | $c_{i2}$ | ... | $c_{iN}$ | ... | $c_{iM}$ | $c_{iM+1}$ | ... | $c_{iM+N}$ |
| ... | ... | ... | | ... | | ... | ... | | ... |

| SEARCH QUERY: cad  RANKING<br>SINGLE-PAGE ANALYSIS  TITLE<br>URL | 1ST RANK | 2ND RANK | 3RD RANK | 4TH RANK | 5TH RANK | 6TH RANK | 7TH RANK | 8TH RANK | 9TH RANK | 10TH RANK |
|---|---|---|---|---|---|---|---|---|---|---|
| DEGREE OF CONTAINMENT OF WORD OF INTEREST A | 360 | 332 | 366 | 235 | 297 | 291 | 297 | 264 | 290 | 270 |
| DEGREE OF CONTAINMENT OF WORD OF INTEREST B | 0 | 0 | 0 | 6 | 31 | 30 | 55 | 46 | 13 | 4 |
| DEGREE OF CONTAINMENT OF WORD OF INTEREST C | 48 | 16 | 127 | 64 | 10 | 30 | 51 | 26 | 23 | 18 |

| MORPHEME | DEGREE OF IMPORTANCE ▼ | | | | | | | | | | |
|---|---|---|---|---|---|---|---|---|---|---|---|
| "cad" | 957 | 148 | 22 | 150 | 79 | 38 | 70 | 11 | 14 | 79 | 17 |
| "autocad" | 788 | 13 | 18 | 26 | 3 | 16 | 1 | 11 | 2 | 1 | 0 |
| "revit" | 697 | 4 | 3 | 10 | 0 | 0 | 0 | 7 | 2 | 1 | 0 |
| "bim" | 558 | 32 | 4 | 4 | 1 | 0 | 0 | 6 | 3 | 2 | 0 |
| "autodesk" | 433 | 44 | 2 | 4 | 0 | 0 | 6 | 17 | 1 | 0 | 1 |
| "draw" | 459 | 5 | 4 | 1 | 2 | 0 | 0 | 1 | 0 | 0 | 1 |
| "diagram" | 456 | 16 | 5 | 24 | 13 | 0 | 3 | 2 | 1 | 14 | 0 |
| "cad" | 442 | 1 | 1 | 8 | 0 | 0 | 1 | 0 | 0 | 0 | 0 |
| "draft" | 427 | 9 | 2 | 3 | 0 | 6 | 0 | 1 | 0 | 3 | 0 |
| "aided" | 424 | 18 | 1 | 5 | 0 | 0 | 0 | 1 | 0 | 0 | 1 |
| "engineering" | 403 | 10 | 0 | 3 | 1 | 0 | 0 | 1 | 0 | 0 | 0 |
| "civil" | 387 | 6 | 1 | 0 | 0 | 0 | 13 | 1 | 0 | 0 | 1 |
| "arisya" | 387 | 5 | 0 | 1 | 0 | 0 | 0 | 1 | 4 | 0 | 4 |
| "dood" | 376 | 3 | 0 | 89 | 0 | 0 | 0 | 4 | 1 | 0 | 0 |
| "carin" | 359 | 5 | 0 | 23 | 0 | 0 | 0 | 5 | 0 | 0 | 1 |
| "craa" | 364 | 11 | 0 | 0 | 0 | 0 | 0 | 4 | 0 | 0 | 24 |
| "irminter" | 359 | 5 | 0 | 4 | 0 | 0 | 0 | 5 | 0 | 0 | 0 |

DIFFERENCE IS UNCLEAR!

| SEARCH QUERY cad | RANKING | 1ST RANK | 2ND RANK | 3RD RANK | 4TH RANK | 5TH RANK | 6TH RANK | 7TH RANK | 8TH RANK | 9TH RANK | 10TH RANK |
|---|---|---|---|---|---|---|---|---|---|---|---|
| SINGLE-PAGE ANALYSIS | TITLE | = | = | = | = | = | = | = | = | = | = |
| | URL | — | — | — | — | — | — | — | — | — | — |
| DEGREE OF CONTAINMENT OF WORD OF INTEREST A | | 360 | 332 | 366 | 235 | 297 | 291 | 297 | 264 | 290 | 270 |
| DEGREE OF CONTAINMENT OF WORD OF INTEREST B | | 0 | 0 | 0 | 6 | 31 | 30 | 55 | 46 | 13 | 4 |
| DEGREE OF CONTAINMENT OF WORD OF INTEREST C | | 48 | 16 | 127 | 64 | 10 | 30 | 51 | 26 | 23 | 18 |

| MORPHEME | DEGREE OF IMPORTANCE | | | | | | | | | | |
|---|---|---|---|---|---|---|---|---|---|---|---|
| "cad" | 957 | 148 | 22 | 150 | 79 | 38 | 70 | 11 | 14 | 79 | 17 |
| "design" | 248 | 35 | 21 | 44 | 30 | 25 | 22 | 7 | 11 | 52 | 29 |
| "autodesk" | 788 | 13 | 18 | 26 | 3 | 16 | 1 | 11 | 2 | 1 | 0 |
| "ization" | 102 | 24 | 10 | 9 | 2 | 1 | 2 | 4 | 10 | 2 | 8 |
| "software" | 144 | 25 | 8 | 8 | 0 | 0 | 0 | 1 | 0 | 0 | 5 |
| "diagram" | 456 | 16 | 5 | 24 | 13 | 2 | 12 | 2 | 1 | 14 | 1 |
| "prepare" | 147 | 10 | 6 | 67 | 10 | | | 1 | 2 | 1 | 5 |
| "soft" | 169 | 6 | 11 | 41 | 10 | 13 | 11 | 11 | 5 | 10 | 0 |
| "architecture" | 192 | 33 | 4 | 11 | 1 | 0 | 0 | 8 | 1 | 7 | 0 |
| "product" | 186 | 14 | 6 | 5 | 0 | 0 | 0 | 6 | 24 | 1 | 23 |
| "bim" | 568 | 32 | 4 | 4 | 2 | 0 | 0 | 0 | 3 | 2 | 0 |
| "fusion" | 701 | 11 | 1 | 67 | 0 | 0 | 0 | 7 | 0 | 0 | 0 |
| "revit" | 597 | 4 | 3 | 10 | 0 | 0 | 0 | 0 | 2 | 1 | 0 |
| "modeling" | 255 | 10 | 1 | 12 | 2 | 0 | 1 | 17 | 0 | 0 | 0 |
| "autodesk" | 483 | 44 | 2 | 4 | 0 | 0 | 5 | 1 | 1 | 0 | 0 |
| "design" | 272 | 44 | 2 | 4 | 0 | 12 | | | 0 | 0 | 0 |
| "region" | 248 | 11 | 1 | 6 | 12 | | | 1 | 0 | 9 | 1 |

DIFFERENCE IS UNCLEAR!

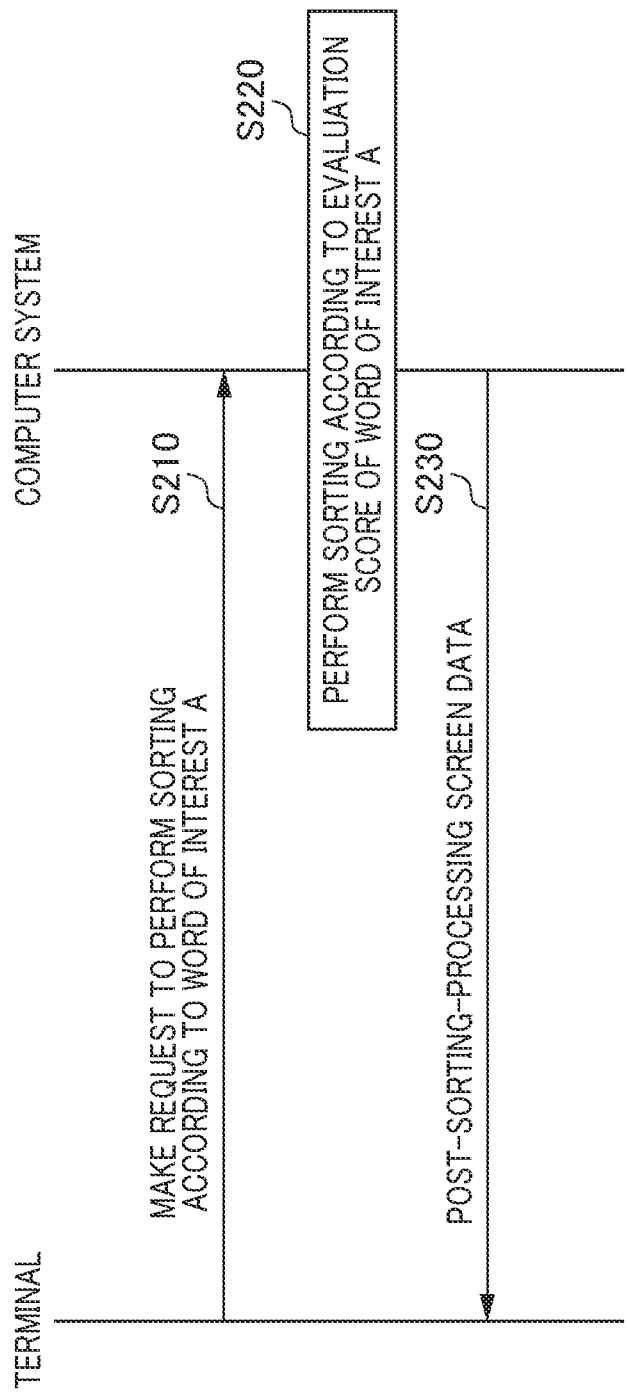

FIG.10

| SEARCH QUERY: cad  RANKING SINGLE-PAGE ANALYSIS | TITLE URL | 1ST RANK | 2ND RANK | 3RD RANK | 4TH RANK | 5TH RANK | 6TH RANK | 7TH RANK | 8TH RANK | 9TH RANK | 10TH RANK |
|---|---|---|---|---|---|---|---|---|---|---|---|
| | | ≡ | ≡ | ≡ | ≡ | — | ≡ | ≡ | ≡ | ≡ | ≡ |
| DEGREE OF CONTAINMENT OF WORD OF INTEREST A | | 360 | 332 | 366 | 235 | 297 | 291 | 297 | 264 | 290 | 270 |
| DEGREE OF CONTAINMENT OF WORD OF INTEREST B | | 0 | 0 | 0 | 6 | 31 | 30 | 55 | 46 | 13 | 4 |
| DEGREE OF CONTAINMENT OF WORD OF INTEREST C | | 48 | 16 | 127 | 64 | 10 | 30 | 51 | 26 | 23 | 18 |

<SORT>
DESCENDING ORDER
ASCENDING ORDER    B13

<FILTER>
ONLY NOT-USED
ONLY USED    B12

DIFFERENCE IS CLEAR!

| MORPHEME | DEGREE OF IMPORTANCE | | | | | | | | | | NOT-USED |
|---|---|---|---|---|---|---|---|---|---|---|---|
| "fusion" | 201 | 11 | 1 | 67 | 0 | 0 | 0 | 0 | 0 | 0 | 0 |
| "modeling" | 255 | 10 | 1 | 12 | 2 | 0 | 0 | 0 | 0 | 0 | 0 |
| "computed" | 246 | 21 | 1 | 5 | 0 | 0 | 3 | 0 | 0 | 0 | 0 |
| "aided" | 414 | 18 | 1 | 5 | 0 | 0 | 3 | 6 | 0 | 0 | 0 |
| "inventer" | 359 | 5 | 1 | 4 | 0 | 8 | 0 | 1 | 0 | 0 | 0 |
| "license" | 158 | 1 | 1 | 22 | 0 | 0 | 0 | 0 | 0 | 0 | 0 |
| "special" | 106 | 2 | 1 | 5 | 1 | 0 | 2 | 0 | 0 | 0 | 0 |
| "cad" | 442 | 1 | 2 | 8 | 0 | 3 | 0 | 0 | 0 | 0 | 0 |
| "block" | 108 | 1 | 1 | 3 | 0 | 0 | 0 | 0 | 0 | 0 | 0 |
| "performance" | 172 | 1 | 2 | 1 | 0 | 0 | 1 | 1 | 0 | 0 | 0 |
| "mounted" | 125 | 1 | 1 | 2 | 0 | 0 | 0 | 17 | 0 | 0 | 0 |
| "software" | 144 | 25 | 8 | 8 | 0 | 0 | 0 | 1 | 0 | 0 | 0 |
| "autodesk" | 493 | 44 | 2 | 4 | 1 | 0 | 1 | 4 | 0 | 0 | 0 |
| "design" | 272 | 44 | 2 | 4 | 0 | 0 | 0 | 0 | 0 | 0 | 0 |
| "automated" | 120 | 4 | 5 | 0 | 1 | 0 | 0 | 0 | 0 | 0 | 0 |
| "jw" | 222 | 5 | 0 | 4 | 0 | 0 | 0 | 0 | 0 | 0 | 0 |
| "dea" | 135 | 6 | 6 | 5 | 0 | 0 | 0 | 0 | 0 | 0 | 0 |

FIG.12

| SEARCH QUERY cad RANKING SINGLE-PAGE ANALYSIS | TITLE | 1ST RANK | 2ND RANK | 3RD RANK | 4TH RANK | 5TH RANK | 6TH RANK | 7TH RANK | 8TH RANK | 9TH RANK | 10TH RANK |
|---|---|---|---|---|---|---|---|---|---|---|---|
| G6 | URL | ≡ | ≡ | ≡ | ≡ | — | ≡ | ≡ | ≡ | ≡ | ≡ |
| DEGREE OF CONTAINMENT OF WORD OF INTEREST A | | 360 | 332 | 366 | 235 | 297 | 291 | 297 | 264 | 290 | 270 |
| DEGREE OF CONTAINMENT OF WORD OF INTEREST B | | 0 | 0 | 0 | 6 | 31 | 30 | 55 | 46 | 13 | 4 |
| DEGREE OF CONTAINMENT OF WORD OF INTEREST C | | 48 | 16 | 127 | 64 | 10 | 30 | 51 | 26 | 23 | 18 |

| MORPHEME | DEGREE OF IMPORTANCE | | | | | | | | | | |
|---|---|---|---|---|---|---|---|---|---|---|---|
| "caiis" | 224 | 0 | 0 | 0 | 0 | 1 | 0 | 1 | 1 | 0 | 0 |
| "auto cad" | 221 | 0 | 0 | 0 | 0 | 1 | 1 | 0 | 0 | 0 | 0 |
| "abaqus" | 207 | 0 | 0 | 0 | 0 | 0 | 0 | 1 | 1 | 0 | 0 |
| "addirhre" | 207 | 0 | 0 | 0 | 0 | 0 | 0 | 2 | 0 | 0 | 1 |
| "otsuka" | 199 | 0 | 0 | 0 | 0 | 14 | 0 | 2 | 1 | 0 | 0 |
| "meeharical" | 199 | 0 | 0 | 0 | 0 | 0 | 0 | 1 | 0 | 0 | 0 |
| "stress" | 191 | 0 | 0 | 0 | 0 | 2 | 0 | 0 | 2 | 7 | 2 |
| "subscription" | 189 | 0 | 0 | 0 | 1 | 0 | 18 | 8 | 0 | 1 | 1 |
| "fujita" | 165 | 0 | 0 | 0 | 0 | 13 | 11 | 6 | 24 | 2 | 0 |
| "work from home" | 145 | 0 | 0 | 0 | 0 | 0 | 0 | 0 | 3 | 0 | 0 |
| "punctual" | 140 | 0 | 0 | 0 | 1 | 0 | 0 | 7 | 0 | 1 | 0 |
| "coronavirus" | 135 | 0 | 0 | 0 | 0 | 0 | 0 | 0 | 2 | 0 | 0 |
| "leature" | 124 | 0 | 0 | 0 | 1 | 0 | 0 | 17 | 0 | 1 | 0 |
| "high-spec" | 121 | 0 | 0 | 0 | 0 | 0 | 0 | 0 | 1 | 0 | 0 |
| "patience" | 120 | 0 | 0 | 0 | 0 | 0 | 0 | 4 | 6 | 0 | 0 |
| "otsuka corporation" | 120 | 0 | 0 | 0 | 4 | 0 | 0 | 5 | 4 | 2 | 0 |
| "nojyo" | 118 | 0 | 0 | 0 | 0 | 0 | 0 | 0 | 0 | 0 | 0 |

| SEARCH QUERY:cad SINGLE-PAGE ANALYSIS | RANKING | TITLE | 1ST RANK | 2ND RANK | 3RD RANK | 4TH RANK | 5TH RANK | 6TH RANK | 7TH RANK | 8TH RANK | 9TH RANK | 10TH RANK |
|---|---|---|---|---|---|---|---|---|---|---|---|---|
| | | URL | | | | | | | | | | |

| | 1ST | 2ND | 3RD | 4TH | 5TH | 6TH | 7TH | 8TH | 9TH | 10TH |
|---|---|---|---|---|---|---|---|---|---|---|
| DEGREE OF CONTAINMENT OF WORD OF INTEREST A | 360 | 332 | 366 | 235 | 297 | 291 | 297 | 264 | 290 | 270 |
| DEGREE OF CONTAINMENT OF WORD OF INTEREST B | 0 | 0 | 0 | 6 | 31 | 30 | 55 | 46 | 13 | 4 |
| DEGREE OF CONTAINMENT OF WORD OF INTEREST C | 48 | 16 | 127 | 64 | 10 | 30 | 51 | 26 | 23 | 18 |

| MORPHEME | DEGREE OF IMPORTANCE | | | | | | | | | | |
|---|---|---|---|---|---|---|---|---|---|---|---|
| "direction" | 17 | 0 | 0 | 12 | 20 | 0 | 0 | 5 | 0 | 6 | 0 |
| "information" | 23 | 10 | 4 | 9 | 2 | 2 | 2 | 7 | 12 | 3 | 5 |
| "side" | 24 | 0 | 0 | 1 | 0 | 2 | 4 | 5 | 3 | 4 | 0 |
| "day" | 25 | 25 | 0 | 9 | 4 | 0 | 3 | 17 | 2 | 1 | 0 |
| "yen" | 15 | 0 | 12 | 20 | 2 | 3 | 0 | 0 | 0 | 0 | 0 |
| "can" | 28 | 12 | 0 | 60 | 23 | 1 | 17 | 3 | 4 | 2 | 12 |
| "during" | 25 | 0 | 0 | 2 | 1 | 0 | 0 | 1 | 3 | 0 | 1 |
| "product" | 11 | 0 | 0 | 0 | 0 | 1 | 0 | 0 | 1 | 0 | 0 |
| "money" | 12 | 0 | 0 | 0 | 0 | 0 | 0 | 0 | 0 | 7 | 0 |
| "labyrinth" | 12 | 0 | 0 | 0 | 0 | 1 | 0 | 0 | 1 | 1 | 0 |
| "law" | 12 | 0 | 0 | 0 | 1 | 0 | 0 | 0 | 0 | 0 | 0 |
| "top" | 12 | 0 | 0 | 6 | 0 | 0 | 0 | 0 | 0 | 1 | 0 |
| "telephone" | 12 | 0 | 0 | 0 | 4 | 1 | 1 | 11 | 0 | 0 | 0 |
| "you" | 29 | 0 | 0 | 0 | 0 | 0 | 0 | 0 | 0 | 0 | 0 |
| "list" | 12 | 0 | 0 | 8 | 0 | 0 | 3 | 1 | 0 | 1 | 0 |
| "attention" | 12 | 1 | 0 | 0 | 7 | 0 | 0 | 1 | 0 | 0 | 0 |
| "λ" | 32 | | | | | | | | | 7 | 0 |

FIG.17

| SEARCH QUERY | TOTAL NUMBER OF SEARCHES/MONTH | | 1ST RANK | 2ND RANK | 3RD RANK | 4TH RANK | 5TH RANK |
|---|---|---|---|---|---|---|---|
| cad | 82,665 | | | | | | |
| | | NAME OF SITE | CAD IS | CAD SOFTWARE IS | THOROUGH EXPLANATION OF CAD | KNOWLEDGE OF CAD | RECOMMENDATION OF CAD |
| | | URL | http://www.example1.com | http://www.eample2.com | http://www.eample3.com | http://www.eample4.com | http://www.eample5.com |
| MORPHEME | DEGREE OF DEMAND | | USAGE EXAMPLE ▶ | USAGE EXAMPLE ▶ | USAGE EXAMPLE ▶ | USAGE EXAMPLE ▶ | USAGE EXAMPLE ▶ |
| fusion | 201 | | | | com/fusion360/Fusion | | |
| MODELING | 255 | | CONCEPT MODELING | IN ADDITION TO MODELING, TrustedDWG™ | 3D MODELING METHOD | (RESIDENCE, OFFICE BUILDING, ETC.) PDM MODELING BUSINESS | |
| CALL | 78 | | IN THE FIELD OF SEMICONDUCTOR CIRCUIT DESIGN, IT IS NOT ONLY SHAPE DESIGN, AND IT IS CALLED EDA IN MANY CASES | IS CALLED | CHECK INTERFERENCE BETWEEN PARTS CHECK INTERFERENCE BETWEEN PARTS PREPARE DATA FOR MACHINING ONE EXAMPLE OF A MACHINE ESSENTIAL TO CRAFTSMANSHIP IS A MACHINE TOOL CALLED A MACHINING CENTER | FOR EXAMPLE, IN THE SITE OF MACHINE DESIGN, CAD FOR A MACHINE CALLED "MECHANICAL CAD" IS ALSO USED IN MANY CASES, AND IN THE SITE THAT HANDLES A CIRCUIT DIAGRAM OF ELECTRONIC PARTS, ETC., ELECTRONIC CAD IS USED. | |
| PRICE | 51 | | THREE-DIMENSIONAL CAD IS CLASSIFIED INTO HIGH-END, MID-RANGE, ETC., ACCORDING TO A TARGET USED IN BUSINESS. A TYPE OF A SHAPE ELEMENT THAT CAN BE HANDLED, AND A PRICE RANGE | GREAT VALUE AT REASONABLE PRICE | FURTHER, IT IS CHARGED, BUT THE PRICE ITSELF IS VERY REASONABLE | | REASONABLE PRICE ¥75,625~ |
| inventor | 359 | | inventor | | | | |
| LICENSE | 158 | | COMMERCIALLY AVAILABLE CAD IS GENERALLY UPDATED EVERY YEAR, AND EXPENSIVE LICENSE FEE IS CHARGED EVERY TIME, AND THEREFORE MIDDLE | FOR LICENSE, 2D·3D SO FAR | LICENSE TYPE 2 | | LICENSE |

G9

INFORMATION PROCESSING SYSTEM, INFORMATION PROCESSING METHOD, AND PROGRAM

TECHNICAL FIELD

The present invention relates to an information processing system, an information processing method, and a program.

BACKGROUND ART

In recent years, search engines analyze text data of web pages and determine search-ranking. As a technology aiming at displaying a web page at a higher rank, for example, Patent Literature 1 discloses a technique including first processing for performing morpheme analysis processing on content of elements of web page data of each of the predetermined number of web pages to be analyzed that have been obtained by web page obtaining means, second processing for counting the number of appearances of a morpheme of the same kind included in a morpheme group obtained in the first processing, third processing for causing the number of the appearances of the morpheme of each kind contained in each of the web pages to be analyzed that have been obtained in the second processing to act on a predetermined evaluation function to obtain an evaluation value for each kind of morpheme indicating a degree of contribution of the kind of morpheme to a rank of the corresponding page to be analyzed in a search result of a search using a target keyword as a search query, and presenting, as an analysis result, a list of the evaluation values for the respective kinds of morpheme obtained for each of the predetermined number of web pages to be analyzed.

CITATION LIST

Patent Literature

Patent Literature 1: JP 6164436 B2

SUMMARY OF INVENTION

Technical Problem

Means of the invention of Patent Literature 1 is a useful technology, but it has still been requested that a morpheme that contributes to improvement in search ranking or a morpheme that has a possibility of reduction in the search ranking be easily grasped.

The present invention has been made in view of the problem described above, and it is an object of the present invention to provide an information processing system, an information processing method, and a program that enable a morpheme that contributes to improvement in the search ranking or a morpheme that has a possibility of reduction in the search ranking to be easily grasped.

Solution to Problem

An information processing system in a first aspect of the present invention includes: extraction means for extracting one group of words of interest from a group of first words of interest, a group of second words of interest, and a group of third words of interest of a corresponding morpheme in accordance with a first evaluation score, a second evaluation score, and a third evaluation score for each of morphemes that are contained in character data posted on each of web pages included in a result of a search that has been conducted by a search engine by using a search query; and output means for outputting data for displaying at least the extracted group of words of interest, the first evaluation score is a score that has been set to extract a morpheme for which the number of appearances contained in higher-rank web pages is larger, and the number of appearances contained in lower-rank web pages is smaller, the higher-rank web pages appearing at higher ranks in the result of the search, the lower-rank web pages appearing at lower ranks in the result of the search, the second evaluation score is a score that has been set to extract a morpheme used less frequently on the higher-rank web pages, but having a higher degree of importance relating to the search query, and the third evaluation score is a score that has been set to extract a morpheme applied less frequently on web pages having themes relating to the search query, and applied more frequently on web pages having themes other than the themes.

By employing this configuration, in a case where the group of first words of interest has been output, as the group of first words of interest, a morpheme for which a larger number of appearances are contained in higher-rank web pages that appear at higher ranks in the result of the search, and a smaller number of appearances are contained in lower-rank web pages that appears at lower ranks in the result of the search is extracted. This enables a user to easily grasp a morpheme that contributes to improvement in search ranking. Furthermore, in a case where the group of second words of interest has been output, as the group of second words of interest, a morpheme for which a degree of importance relating to the search query is higher than a threshold, and which is used less frequently on the higher-rank web pages is extracted. This enables a user to easily grasp the morpheme that contributes to improvement in the search ranking, and in particular, a morpheme that easily causes differentiation from the-higher-rank web pages. Furthermore, in a case where the group of third words of interest has been output, as the group of third words of interest, a morpheme applied less frequently on web pages having themes relating to the search query, and applied more frequently on web pages having themes other than the themes is extracted. This enables a user to easily grasp a morpheme having a possibility of reduction in the search ranking.

An information processing system in a second aspect of the present invention is the information processing system in the first aspect, and the output means may output information for displaying the number of appearances of each of the words of interest contained in each of the web pages included in the extracted group of words of interest.

An information processing system in a third aspect of the present invention is the information processing system in the first or second aspect, in extracting the group of words of interest, the extraction means may extract the group of first words of interest, the group of second words of interest, or the group of third words of interest from a group of morphemes that is not used or is used on a target web page, and the output means may output data for displaying at least the group of first words of interest, the group of second words of interest, or the group of third words of interest that has been extracted.

An information processing system in a fourth aspect of the present invention is the information processing system in the third aspect, further including reception means for receiving a request to perform sorting according to the morpheme that is not used or is used on the target web page, and a first word of interest, a second word of interest, or a third word of interest, and the extraction means may extract the group of first words of interest, the group of second words of interest, or the group of third words of interest that has been obtained by sorting the morphemes that are not used or are used on the target web page in accordance with an evaluation score of the first word of interest, the second word of interest, or the third word of interest.

An information processing system in a fifth aspect of the present invention is the information processing system in any of the first to fourth aspects, data to be output by the output means also includes a degree of containment of each of the words of interest in each of the web pages, reception means for receiving, from a user, an operation to perform sorting according to the degree of containment of the word of interest, and in a case where the operation has been received, the output means may output data in which the web pages included in the result of the search have been sorted in order of the degree of containment of each of the words of interest.

An information processing system in a sixth aspect of the present invention is the information processing system in the first aspect, and the output means may output information for displaying the number of appearances of each of the words of interest contained in each of the web pages for each of the words of interest in a state where the words of interest have been sorted according to the numbers of appearances of each of the words of interest contained in the higher-rank web pages.

An information processing system in a seventh aspect of the present invention is the information processing system in the first aspect, and the output means may output data for displaying the group of words of interest contained in the higher-rank pages and/or the lower-rank pages from the extracted group of words of interest.

An information processing system in an eighth aspect of the present invention is the information processing system in the seventh aspect, and the output means may output data for displaying, in addition to the word of interest, at least one of the number of appearances of the morpheme contained in the higher-rank pages and/or the lower-rank pages for the extracted word of interest, the degree of importance of the extracted word of interest, a scale of economy or a ratio of the scale of economy of the extracted word of interest, the number of searches or an occupancy rate of the number of searches of the extracted word of interest, and the number of queries or a query occupancy rate of the extracted word of interest.

An information processing system in a ninth aspect of the present invention is the information processing system in the seventh or eighth aspect, and the output means may output data for displaying the extracted words of interest in order of the number of appearances contained in the higher-rank web pages and/or the lower-rank web pages, in order of the degree of importance, in order of the scale of economy, in order of the number of searches, or in order of the number of queries.

An information processing system in a tenth aspect of the present invention is the information processing system in any of the seventh to ninth aspects, and the output means may output data for displaying the extracted words of interest in display sizes of the words of interest that have been scaled according to the number of appearances contained in the higher-rank web pages and/or the lower-rank web pages, the degree of importance, the scale of economy, the number of searches, or the number of queries.

An information processing system in an eleventh aspect of the present invention is the information processing system in any of the seventh to tenth aspects, and the output means may output data for displaying the words of interest that are commonly contained in the higher-rank web pages and the lower-rank web pages.

An information processing system in a twelfth aspect of the present invention is the information processing system in any of the eleventh aspect, and the output means may output data for conducting display that enables a user to set a level of containment of the words of interest commonly contained in the higher-rank web pages and the lower-rank web pages, and may change the words of interest commonly contained in the higher-rank web pages and the lower-rank web pages in accordance with the degree of containment that has been set.

An information processing system in a thirteenth aspect of the present invention is the information processing system in any of the seventh to twelfth aspects, and the output means may output data for conducting display that enables a user to set an upper limit of the number of words of interest to be displayed that are contained in the higher-rank web pages, an upper limit of the number of words of interest to be displayed that are contained in the lower-rank web pages, or an upper limit of the number of words of interest to be displayed that are commonly contained in the lower-rank web pages.

An information processing system in a fourteenth aspect of the present invention is the information processing system in any of the first to thirteenth aspects, further including character string extraction means for extracting, as a character string, the word of interest together with at least one or more characters before and/or after appearance of the word of interest, from the higher-rank web pages, and the output means may output data for displaying the extracted character string.

An information processing method in a fifteenth aspect of the present invention includes: an extraction process of extracting a plurality of appearances of one word of interest among a first word of interest, a second word of interest, and a third word of interest in accordance with an evaluation score for the first word of interest, an evaluation score for the second word of interest, and an evaluation score for the third word of interest that have been determined from character data posted on each of web pages included in a result of a search that has been conducted by a search engine by using a search query; and an output process of outputting data for displaying at least each of the extracted words of interest, the evaluation score for the first word of interest is a score that has been set to extract a morpheme for which the number of appearances contained in higher-rank web pages is larger, and the number of appearances contained in lower-rank web pages is smaller, the higher-rank web pages appearing at higher ranks in the result of the search, the lower-rank web pages appearing at lower ranks in the result of the search, the evaluation score for the second word of interest is a score that has been set to extract a morpheme having a degree of importance relating to the search query is higher than a threshold, and used less frequently on the higher-rank web pages, and the evaluation score for the third word of interest is a score that has been set to extract a morpheme applied less frequently on web pages having themes relating to the search query, and applied more frequently on the web pages having themes other than the themes.

A program in a sixteenth aspect of the present invention is a program for causing a computer to perform: an extraction process of extracting appearances of one word of interest among a first word of interest, a second word of interest, and a third word of interest in accordance with an evaluation score for the first word of interest, an evaluation score for the second word of interest, and an evaluation score for the third word of interest that have been determined from character data posted on each of web pages included in a result of a search that has been conducted by a search engine by using a search query; and an output process of outputting data for displaying at least each of the extracted words of interest, the evaluation score for the first word of interest is a score that has been set to extract a morpheme for which the number of appearances contained in higher-rank web pages is larger, and the number of appearances contained in lower-rank web pages is smaller, the higher-rank web pages appearing at higher ranks in the result of the search, the lower-rank web pages appearing at lower ranks in the result of the search, the evaluation score for the second word of interest is a score that has been set to extract a morpheme used less frequently on the higher-rank web pages, but having a higher degree of importance relating to the search query, and the evaluation score for the third word of interest is a score that has been set to extract a morpheme applied less frequently on web pages having themes relating to the search query, and applied more frequently on web pages having themes other than the themes.

Advantageous Effects of Invention

In one aspect of the present invention, in a case where a first word of interest has been output, as the first word of interest, a morpheme having a larger number of appearances contained in higher-rank web pages that appear at higher ranks in a search result, and having a smaller number of appearances contained in lower-rank web pages that appear at lower ranks in the search result is extracted. This enables a user to easily grasp a morpheme that contributes to improvement in search ranking. Furthermore, in a case where a second word of interest has been output, as the second word of interest, a morpheme having a higher degree of importance relating to the search query than a threshold, and used less frequently on the higher-rank web pages is extracted. This enables a user to easily grasp a morpheme that contributes to improvement in the search ranking. Furthermore, in a case where a third word of interest has been output, as the third word of interest, a morpheme applied less frequently on web pages having themes relating to the search query, and applied more frequently on web pages having themes other than the themes is extracted. This enables a user to easily grasp a morpheme having a possibility of reduction in the search ranking.

BRIEF DESCRIPTION OF DRAWINGS

FIG. 4 is a table illustrating the number $c_{i,j}$ of appearances of a morpheme $m_i$ contained in a web page that ranks j-th.

FIG. 6 is an example of a screen indicating a result of performing sorting in order of a degree of importance in a first comparative example.

FIG. 7 is an example of a screen indicating a result of performing sorting in order of an amount of contained appearances with priority of coverage on higher-rank pages in a second comparative example.

FIG. 9B is a sequence diagram illustrating an example of processing in a case where sorting is performed according to the evaluation score of the word of interest A, after the analysis result screen has been displayed.

FIG. 10 is a screen indicating a result of sorting morphemes that are not used on a target web page according to the word of interest A.

FIG. 12 is an example of a screen indicating a result of performing sorting according to an evaluation score of a word of interest B.

FIG. 14 is an example of a screen indicating a result of performing sorting according to an evaluation score of a word of interest C.

FIG. 17 is an example of a screen indicating an example of display of a usage example of morphemes on higher-rank pages.

DESCRIPTION OF EMBODIMENTS

Each embodiment is described below with reference to the drawings. However, an unnecessarily detailed description is omitted in some cases. For example, a detailed description of an already well-known matter or duplicate description of substantially the same configuration is omitted in some cases. This is to avoid unnecessary redundancy of the description below and make the description below easily understandable to those skilled in the art. In the present embodiment, description is provided under the assumption that a search query is a word or phrase (a word, a phrase, a compound word, or the like) that a user has input to a search box by using a search engine.

An information processing system S according to the present embodiment extracts one group of words of interest from a group of words of interest A (hereinafter also referred to as first words of interest), a group of words of interest B (hereinafter also referred to as second words of interest), and a group of words of interest C (hereinafter also referred to as third words of interest) in accordance with a first evaluation score, a second evaluation score, or a third evaluation score for each morpheme that is contained in character data that is posted on each web page included in a result of a search that has been conducted by a search engine by using a search query. Here, a word of interest is a morpheme.

Then, the information processing system S outputs data for displaying at least the extracted group of words of interest.

Here, the first evaluation score is a score for extracting the first word of interest, and is a score that is set in such a way that a morpheme for which the number of appearances contained in higher-rank web pages that appear at higher ranks in the search result and the number of appearances contained in lower-rank web pages that appear at lower ranks in the search result is extracted.

The second evaluation score is a score for extracting the second word of interest, and is a score that has been set in such a way that a morpheme used less frequently on higher-rank web pages but having a higher degree of importance relating to the search query is extracted.

The third evaluation score is a score for extracting the third word of interest, and is a score that has been set in such a way that a morpheme applied less frequently on web pages having themes relating to the search query and applied more frequently on web pages having themes other than those is extracted.

Figure 1:
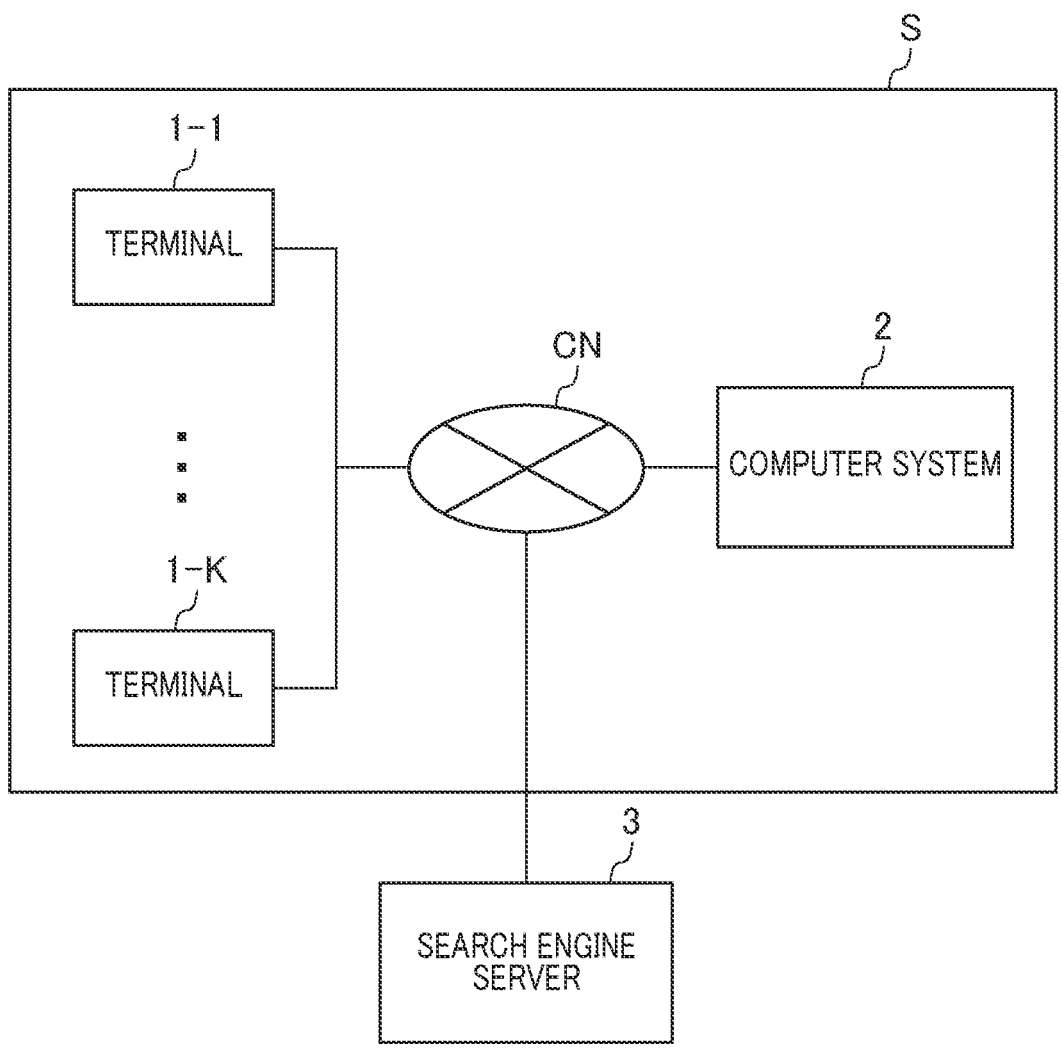
FIG. 1 is a general configuration diagram of an information processing system according to the present embodiment.

FIG. 1 is a general configuration diagram of an information processing system according to the present embodiment. As illustrated in FIG. 1, the information processing system S includes terminals 1-1 to 1-K (K is a natural number), and a computer system 2 that is connected to the terminals 1-1 to 1-K via a communication circuit network CN. A search engine server 3, which is an example of the search engine, is communicably connected to the computer system 2 via the communication circuit network CN.

The terminals 1-1 to 1-K are used by different users, and are, for example, portable telephones such as multifunctional portable telephones (what are called smartphones), tablets, laptop personal computers, desktop personal computers, or the like. In the present embodiment, the description below is provided, as an example, under the assumption that information that has been transmitted from the computer system 2, for example, via a web browser is displayed in the terminals 1-1 to 1-N. Hereinafter, the terminals 1-1 to 1-K are also referred to as terminals 1 collectively.

The computer system 2 is used by an administration group that administers the information processing system S according to the present embodiment. The computer system 2 provides information to the terminals 1-1 to 1-N. The computer system 2 may include a single computer, or may include a plurality of computers. In the present embodiment, description is provided, as an example, under the assumption that the computer system 2 is a single computer.

Figure 2:
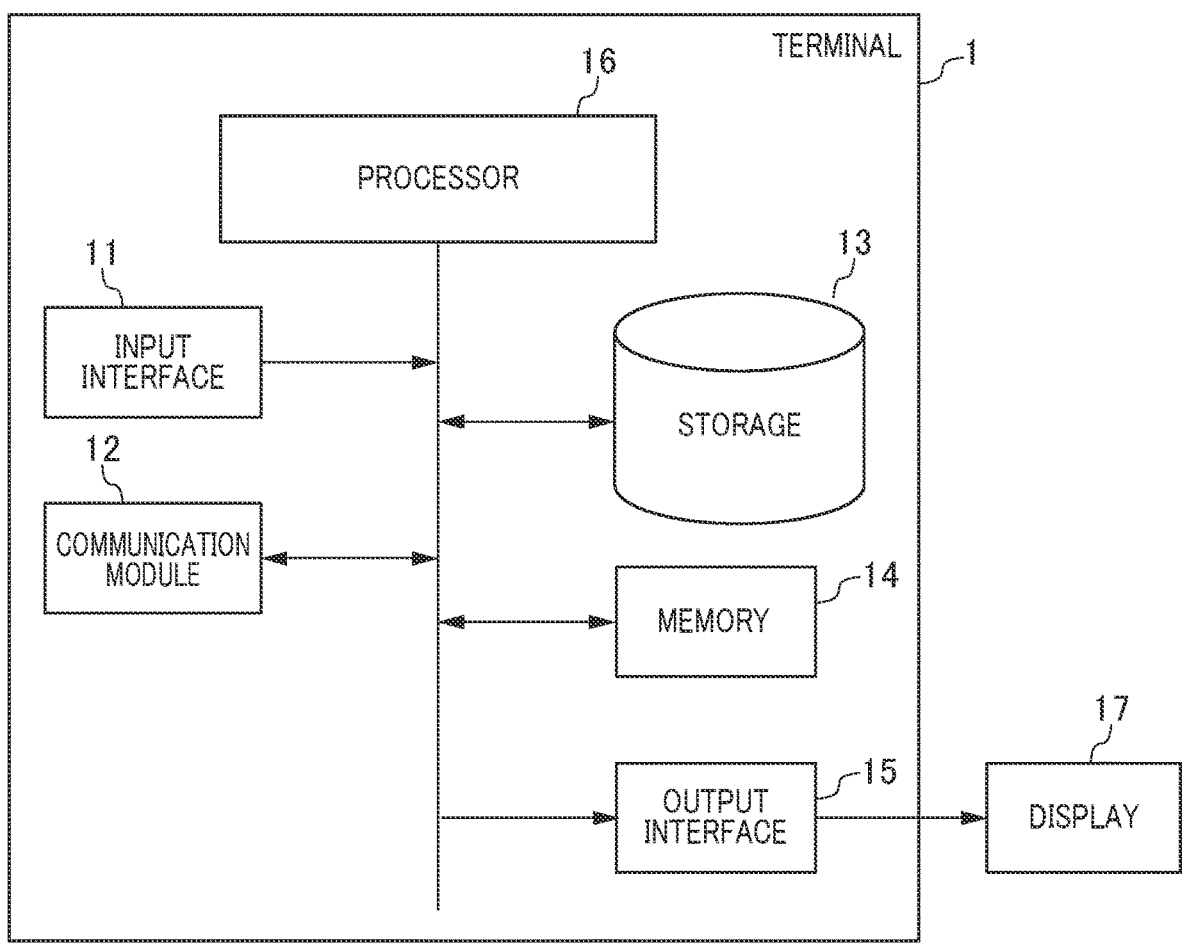
FIG. 2 is a general configuration diagram of a terminal according to the present embodiment.

FIG. 2 is a general configuration diagram of a terminal according to the present embodiment. As illustrated in FIG. 2, the terminal 1 includes, for example, an input interface 11, a communication module 12, a storage 13, a memory 14, an output interface 15, and a processor 16.

The input interface 11 receives an input from a user, and outputs, to the processor 16, an input signal that corresponds to the received input.

The communication module 12 is connected to the communication circuit network CN, and performs communication with the computer system 2. This communication may be of a wired or wireless type, but description is provided under the assumption that the communication is of the wireless type.

In the storage 13, a program to be read and executed by the processor 16 and various types of data are stored.

The memory 14 transitorily holds data and a program. The memory 14 is a volatile memory, and is, for example, a random access memory (RAM).

The output interface 15 is connected to a display 17, and outputs a video signal to the display 17 in accordance with a command of the processor 16.

The processor 16 loads the program into the memory 14 from the storage 13, and executes a series of commands included in the program to perform processing.

The display 17 displays information in accordance with a command of the processor 16. Note that the display 17 may be externally connected to the terminal 1, or may be incorporated into the terminal 1.

Figure 3:
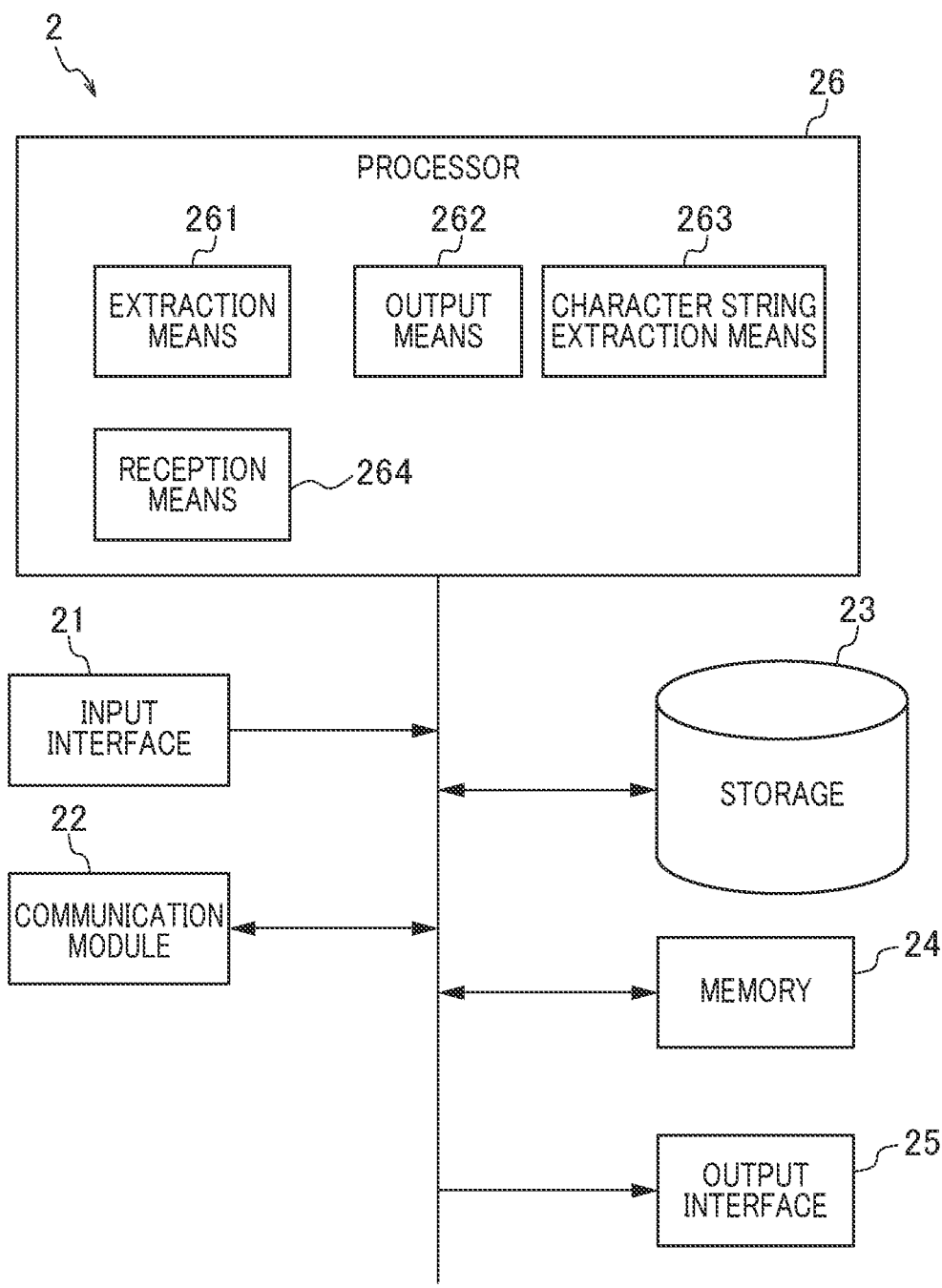
FIG. 3 is a general configuration diagram of a computer system according to the present embodiment.

FIG. 3 is a general configuration diagram of a computer system according to the present embodiment. As illustrated in FIG. 3, the computer system 2 includes an input interface 21, a communication module 22, a storage 23, a memory 24, an output interface 25, and a processor 26.

The input interface 21 receives an input from an administrator (for example, an employee of the administration group) of the computer system 2, and outputs, to the processor 26, an input signal that corresponds to the received input.

The communication module 22 is connected to the communication circuit network CN, and performs communication with the terminals 1-1 to 1-N. This communication may be of a wired or wireless type, but description is provided under the assumption that the communication is of the wired type.

In the storage 23, a program to be read and executed by the processor 26 and various types of data are stored.

The memory 24 transitorily holds data and a program. The memory 24 is a volatile memory, and is, for example, a random access memory (RAM).

The output interface 25 can be connected to an external device, and can output a signal to the external device.

The processor 26 functions as extraction means 261, output means 262, character string extraction means 263, and reception means 264, by loading the program into the memory 24 from the storage 23, and executing a series of commands included in the program. The extraction means 261 extracts a plurality of appearances of one word of interest among the first word of interest, the second word of interest, and the third word of interest, by using character data posted on each web page included in a result of a search that has been conducted by a search engine by using a search query. The output means 262 outputs data for displaying at least each of the extracted words of interest. The character string extraction means 263 extracts, as a character string, the word of interest together with at least one or more characters before and/or after the appearance of the word of interest, from higher-rank web pages that appear at higher ranks of the search result. The reception means 264 receives the search query or a request from a user (specifically, for example, a request from the terminal 1). Each processing will be described below.

<Example of Method for Extracting Word of Interest A>

Next, a method for extracting the word of interest A is described. FIG. 4 is a table illustrating the number $c_{ij}$ of appearances of a morpheme $m_i$ contained in a web page that ranks j-th. With respect to a higher-rank web page in a search result of a search query q, the number $c_i$ of appearances of the morpheme $m_i$ (i is an index of a morpheme) contained in the page that ranks j-th (j is a natural number) satisfies the table of FIG. 4. Here, the number $c_{ij}$ of appearances of the morpheme $m_i$ contained in the page that ranks j-th is indicated for each of the web pages that rank first, second, . . . , N-th (N is an integer of 2 or more), . . . , M-th (M is an integer), (M+1)th, . . . , (M+N)th.

In order to extract a morpheme that is used on higher-rank web pages in the search result, but is not used on lower-rank web pages, the extraction means 261 calculates, as an example, the evaluation score described below for each morpheme $m_i$ in web pages indicated in the search result.

$$\text{score1}_{m_i} = n(\{c_{ij}|c_{ij}=0, M \leq j < N+M\}) - n(\{c_{ij}|c_{ij}=0, 1 \leq j \leq N\}) \quad \text{[Formula 1]}$$

Here, score1 is a difference between the number of lower-rank pages that do not contain a target morpheme $m_i$ at all and the number of higher-rank pages that do not contain the target morpheme $m_i$ at all. Here, $\{x|C(x)\}$ is a set of elements x that satisfy Condition $C(x)$, and $n(A)$ indicates the number of elements of Set A. Therefore, a first term of a right-hand side indicates the number of web pages that do not contain the target morpheme $m_i$ from among web pages that rank M-th to (N+M)th in search ranking, and a second term of the right-hand side indicates the number of web pages that do not contain the target morpheme $m_i$ from among web pages that rank first to N-th in the 2 search ranking. For example, score1 increases as the number of lower-rank pages that do not contain the target morpheme $m_i$ at all increases, and score1 increases as the number of higher-rank pages that do not contain the target morpheme $m_i$ at all decreases.

$$\text{score2}_{m_i} = \Sigma_{j=1}^{N} w_h(j) f(c_{ij}) - \Sigma_{j=M}^{M+N-1} w_l(j) f(c_{ij}) \quad \text{[Formula 2]}$$

Here, score2 is a difference between a higher-rank range total and a lower-rank range total of contained morpheme that have been weighted according to ranks. Here, $w_h(j)$ and $w_l(j)$ are weights according to a rank j. For example, if it is considered that containment in pages that rank higher is important, it is preferable that $w_h(j)$ increase as pages rank higher. If it is considered that non-containment in pages that rank lower is important, it is preferable that $w_l(j)$ increase as pages rank lower. $f(c_{ij})$ is an evaluation function relative to the number of contained appearances of the morpheme. For example, by taking the logarithm of the number of contained appearances of the target morpheme, it is possible, for example, that a difference between 0 and 10 and a difference between 100 and 110 are not treated to be equivalent. A first term of a right-hand side indicates the sum of the products of the weights $w_h(j)$ for web pages that rank first to N-th in the search ranking and the evaluation function $f(c_{ij})$ of the numbers of appearances of the target morpheme $m_i$ contained in the web pages. A second term of the right-hand side indicates the sum of the products of the weights $w_l(j)$ for web pages that rank M-th to (M+N−1)th in the search ranking and the evaluation function $f(c_{ij})$ of the number of appearances of the target morpheme $m_i$ contained in the web pages.

$$\text{score3}_{m_i} = f(c_{i1}) - f(c_{i2}) \quad \text{[Formula 3]}$$

Here, score3 is a difference in the evaluation function $f(c_{ij})$ between the first rank and the second rank in the search ranking, a difference in the evaluation function $f(c_{ij})$ between the second rank and the third rank in the search ranking, . . . .

First, the extraction means 261 calculates score1 for each morpheme $m_i$, makes comparison in score1 among the morphemes $m_i$, and ranks the morphemes $m_i$ in such a way that a morpheme $m_i$ having a higher score of score1 ranks higher. In a case where a plurality of morphemes has the same score of score1, the extraction means 261 makes comparison in score2 among the plurality of morphemes, and ranks the plurality of morphemes in such a way that a morpheme having a higher score of score2 ranks higher.

Moreover, in a case where a plurality of morphemes has the same score of score1 and also has the same score of score2, the extraction means 261 makes comparison in a difference in the evaluation function $f(c_{ij})$ between the first rank and the second rank in the search ranking, as score3, among a plurality of morphemes having the same score of score1 and also having the same score of score2, and ranks the plurality of morphemes in such a way that a morpheme having a higher score of score3 ranks higher. If there is no difference in the evaluation function $f(c_{ij})$ between the first rank and the second rank in the search ranking, the extraction means 261 makes comparison in a difference in the evaluation function $f(c_{ij})$ between the second rank and the third rank in the search ranking, and determines ranking if there is a difference. If there is no difference, the extraction means 261 repeats comparison between ranks that are lower by one in the search ranking, and ranks the morphemes $m_i$.

The extraction means 261 may extract morphemes up to the predetermined rank (for example, up to the 50-th rank) as a result of ranking.

After ranking the morphemes $m_i$, the output means 262 outputs data for displaying a table in which the morphemes $m_i$ are rearranged according to the ranking.

<Example of Method for Extracting Word of Interest B>

Next, a method for extracting the word of interest B is described. The extraction means 261 calculates the evaluation score described below in order to extract a morpheme that is used less frequently on higher-rank web pages but has a higher degree of importance relating to the search query.

$$\text{score1}_{m_i} = n(\{c_{ij}|c_{ij}=0, 1 \leq j \leq N\}) \quad \text{[Formula 4])}$$

Here, score1 is the number of higher-rank web pages that do not contain a target morpheme $m_i$ at all, and more specifically, score1 is the number of web pages that do not contain the target morpheme $m_i$ at all from among web pages that rank first to N-th in the search ranking.

Furthermore, $\{x|C(x)\}$ is the set of elements x that satisfy Condition $C(x)$, and $n(A)$ indicates the number of elements of Set A.

$$\begin{aligned} \text{score2}_{1_{m_i}} &= \begin{cases} 0 & \text{if } c_{i1} > 0, \\ 1 & \text{if } c_{i1} = 0 \end{cases} \\ &\vdots \\ \text{score2}_{N_{m_i}} &= \begin{cases} 0 & \text{if } c_{iN} > 0, \\ 1 & \text{if } c_{iN} = 0 \end{cases} \end{aligned} \quad \text{[Formula 5]}$$

Here, score2 is calculated for each of the web pages that rank first to N-th in the search ranking. In a case where a web page that ranks first in the search ranking contains the target morpheme, $\text{score2}_{1mi}$ is 0. In a case where the web page does not contain the target morpheme, $\text{score2}_{1mi}$ is 1. In a case where the web page that ranks first in the search ranking contains the target morpheme, 0 is obtained. In a case where the web page does not contain the target morpheme, 1 is obtained. Similarly, in a case where a web page that ranks N-th in the search ranking contains the target morpheme, $\text{score2}_{Nmi}$ is 0. In a case where the web page does not contain the target morpheme, $\text{score2}_{Nmi}$ is 1. In a case where the web page that ranks N-th in the search ranking contains the target morpheme, 0 is obtained. In a case where the web page does not contain the target morpheme, 1 is obtained.

$$\text{score3}_{m_i} = -\Sigma_{j=1}^{N} w(j) f(c_{ij}) \quad \text{[Formula 6]}$$

Here, score3 is a value obtained by making the weighted sum of the evaluation function $f(c_{ij})$ for the web pages that rank first to N-th in the search ranking negative, and $f(c_{ij})$ is the evaluation function relative to the number of appearances of a morpheme that has been described above. w(j) is, for example, a weight, and increases, for example, as j decreases (stated another way, as a rank becomes higher). Therefore, a weight for the evaluation function increases for a higher-rank web page, and as the number of appearances of a morpheme contained in the higher-rank web page increases, a negative value increases, and score3 decreases.

$$\text{score4}_{m_i} = s_i \qquad \text{[Formula 7]}$$

Here, $s_i$ is a degree of importance of a morpheme $m_i$ in the search query q. This degree of importance is a parameter that has been set to increase as the morpheme appears more frequently in a group of higher-rank pages in a result of a search using the search query becomes higher, and increase as the morpheme appears less frequently in the group of higher-rank pages in a result of a search using another search query group becomes lower. The degree of importance of a morpheme may be, as an example, the degree of peculiarity described in Patent Literature 1 (JP 6253041 B2), and specifically, the degree of importance may be obtained by calculating a degree of peculiarity as a parlance of the morpheme on the basis of a predetermined evaluation function, but this is not restrictive.

Here, as an example of the degree of importance, the degree of peculiarity described in Patent Literature 1 is described. It is assumed that from among N sites that rank higher in a search for a certain search word $w_i$, the number of sites in which a certain morpheme m is used is $n_{ij}$, and its ratio may be calculated according to the following formula.

$$p(w_i, m_j) = \frac{n_{ij}}{N} \qquad \text{[Formula 8]}$$

A ratio of use of the certain morpheme m of the N sites that rank higher in a search for each of all of the search words $W = (w_1, w_2, w_3 \ldots)$ may be calculated according to the following formula.

$$p(W, m_j) = \frac{\sum_i n_{ij}}{\sum_i N} \qquad \text{[Formula 9]}$$

Then, a degree of peculiarity $s_{ij}$ of an arbitrary morpheme m for an arbitrary search word $w_i$ may be calculated according to the evaluation function described as the following formula. Here, the "degree of peculiarity" means a degree of peculiarity that indicates, as an index, whether each morpheme is generally used as a parlance, or is not generally used as the parlance.

$$s_{ij} = p(w_i, m_j) * \log \frac{1}{p(W, m_j)} \qquad \text{[Formula 10]}$$

First, for example, the extraction means 261 calculates a degree of importance of a morpheme $m_i$, calculates score1 for each of the morphemes $m_i$ having a degree of importance exceeding a threshold, makes comparison in score1 among the morphemes $m_i$, and ranks the morphemes $m_i$ in such a way that a morpheme $m_i$ having a higher score of score1 ranks higher. In a case where a plurality of morphemes has the same score of score1, the extraction means 261 sequentially makes comparison in score2 among the plurality of morphemes, and ranks the plurality of morphemes in such a way that a morpheme having a higher score of score2 ranks higher. Moreover, in a case where score1 is the same score and in a case where score2 is also the same score, the extraction means 261 makes comparison in score3 among a plurality of morphemes having the same score of score1 and also having the same score of score2, and ranks the plurality of morphemes in such a way that a morpheme having a higher score of score3 ranks higher. In a case where all of score1 to score3 are the same scores, the extraction means 261 ranks a plurality of morphemes having the same scores in such a way that a morpheme having a larger number of score4, that is, a morpheme having a higher degree of importance, ranks higher.

<Example of Method for Extracting Word of Interest C>

Next, a method for extracting the word of interest C is described. This word of interest C is a morpheme that has a risk of reduction in search ranking. The extraction means 261 calculates the evaluation score described below in order to extract a morpheme that is used less frequently in a corresponding theme but is used more frequently in another theme.

$$\text{score}_{m_i} = (g_i - C_g)/(s_i - C_s) \qquad \text{[Formula 11]}$$

Here, $g_i$ is a degree of generality (for example, the frequency of use in all themes, or the like) of a morpheme $m_i$, $C_g$ is a constant, $C_s$ is a constant, and $s_i$ is the degree of importance that has been described above.

The extraction means 261 extracts a plurality of morphemes $m_i$ that has been rearranged (stated another way, has been sorted) in such a way that a morpheme for which the evaluation score described above score is higher ranks higher.

Figure 5:
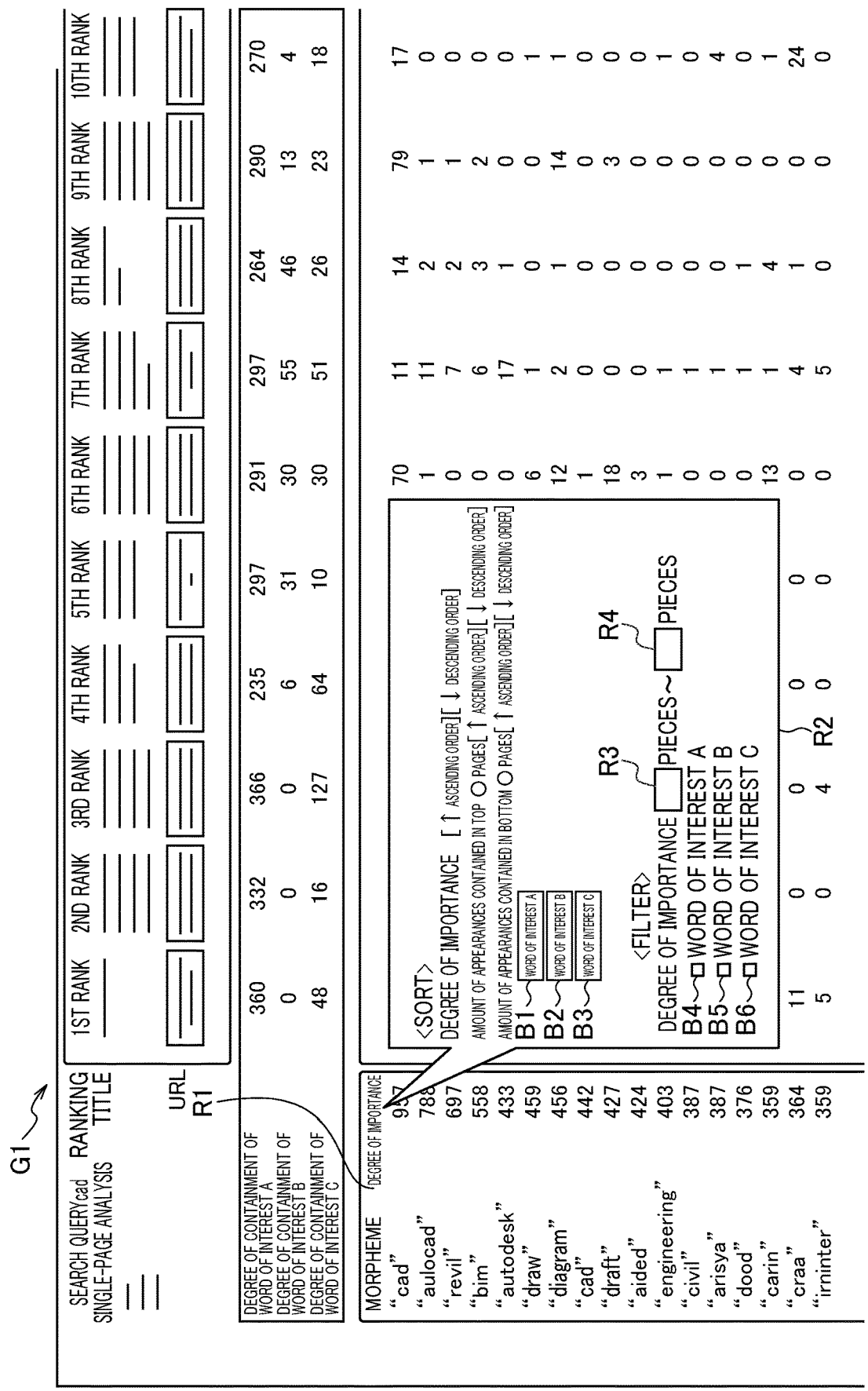
FIG. 5 is an example of an analysis result screen displayed in a terminal.

An example of a "single-page analysis result" obtained by only analyzing morphemes on web pages displayed in a search result without analyzing morphemes on web pages of link destination of the displayed web pages is described below. FIG. 5 is an example of an analysis result screen displayed in a terminal. As illustrated in FIG. 5, on an analysis result screen G1, as an example, web pages that are included in a search result of a search engine using the search query "cad", and rank first to tenth in search ranking are indicated together with titles and URLs of the web pages. As illustrated in FIG. 5, on the analysis result screen G1, morphemes that are contained in all of the web pages that rank first to tenth in the search ranking are arranged in order of the degree of importance, and the numbers of appearances of the morphemes contained in a corresponding web page are indicated for each of the web pages that rank first to tenth in the search ranking in the form of a table.

Moreover, in FIG. 5, a degree of containment of the word of interest A, a degree of containment of the word of interest B, and a degree of containment of the word of interest C are displayed for each of the web pages. Here, the degree of containment of the word of interest A may be the total of the number of appearances of word of interest A contained in each of corresponding web pages, may be a logarithmic value (log) of the number of contained appearances, may be an evaluation function, as described according to Formula (1) in Patent Literature 1 (for example, a logarithmic function for which a maximum value is a predetermined value), or may be the standardized number of contained appearances. Similarly, the degree of containment of the word of interest B may be the total of the number of appearances of word of interest B contained in each of corresponding web pages, may be a logarithmic value (log) of the number of contained appearances, may be an evaluation function, as described according to Formula (1) in Patent Literature 1 (for example, a logarithmic function for which a maximum value is a predetermined value), or may be the standardized number of contained appearances. Similarly, the degree of containment of the word of interest C may be the total of the number of appearances of word of interest C contained in each of corresponding web pages, may be a logarithmic value (log) of the number of contained appearances, may be an evaluation function, as described according to Formula (1) in Patent Literature 1 (for example, a logarithmic function for which a maximum value is a predetermined value), or may be the standardized number of contained appearances.

In a case where the "degree of containment of the word of interest A" has been operated (for example, it has been pressed) on the screen G1 of FIG. 5, the order of display of web pages may be rearranged in descending order (or in ascending order) of the "degree of containment of the word of interest A". Similarly, in a case where the "degree of containment of the word of interest B" has been operated (for example, it has been pressed) on the screen G1 of FIG. 5, the order of display of web pages may be rearranged in descending order (or in ascending order) of the "degree of containment of the word of interest B". Similarly, in a case where the "degree of containment of the word of interest C" has been operated (for example, it has been pressed) on the screen G1 of FIG. 5, the order of display of web pages may be rearranged in descending order (or in ascending order) of the "degree of containment of the word of interest C".

In order to achieve this processing, data output by the output means 262 (for example, data for displaying the screen G1) includes a degree of containment of a word of interest for each web page. The reception means 264 receives, from a user, an operation to perform sorting according to the degree of containment of the word of interest. In a case where 262 has received the operation, the output means may output data in which web pages included in the search result have been sorted in order of the degree of containment of the word of interest.

Note that display and an action at the time of operation of the degree of containment of the word of interest A, the degree of containment of the word of interest B, or the degree of containment of the word of interest C are similar in FIGS. 6 to 8, 10, 12, and 14 that follow.

Moreover, in FIG. 5, the degree of importance is indicated for each morpheme. This degree of importance for each of the morphemes may be, for example, the total of the numbers of appearances of a corresponding morpheme contained in web pages that rank first to N-th in the search ranking, or may be an index of this total.

For example, in a case where the characters R1 for degree of importance have been clicked, a menu R2 is displayed. In the menu, by what, sorting will be performed can be selected. For example, display is conducted in such a way that a user can select by which of the degree of importance, an amount of contained appearances in top o pages, or an amount of contained appearances in bottom o pages, and for which of the word of interest A, the word of interest B, and the word of interest C, morphemes will be sorted. Specifically, for example, for the degree of importance, the amount of contained appearances in top o pages, or the amount of contained appearances in bottom o pages, sorting can be performed when a user clicks ascending order (or an up-arrow) or descending order (or a down-arrow). Furthermore, sorting can be performed when a user presses the button B1 for word of interest A, the button B2 for word of interest B, or the button B3 for word of interest C.

Furthermore, for example, display is conducted in such a way that morphemes can be filtered when a user specifies a range of the degree of importance by using a minimum value and a maximum value. Display is conducted in such a way that filtering can be performed when a user specifies a morpheme according to whether morphemes correspond to the word of interest A, the word of interest B, or the word of interest C. For example, with respect to the degree of importance, a minimum value can be specified in a text box R3, and a maximum value can be specified in a text box R4. For example, by checking a check box B4 of the word of interest A, filtering can be performed according to whether morphemes correspond to the word of interest A. By checking a check box B5 of the word of interest B, filtering can be performed according to whether morphemes correspond to the word of interest B. By checking a check box B6 of the word of interest C, filtering can be performed according to whether morphemes correspond to the word of interest C. A user may perform sorting without the filter described above, or may be perform sorting with the filter described above.

First Comparative Example: Sorting in Order of Degree of Importance

FIG. 6 is an example of a screen indicating a result of performing sorting in order of a degree of importance in a first comparative example. As illustrated as a screen G2 in FIG. 6, in comparison between the numbers of appearances of morphemes contained in top three web pages and the numbers of appearances of the morphemes contained in bottom three web pages, a difference is somewhat unclear, because the morphemes are also contained in bottom three web pages.

Second Comparative Example: Sorting in Order of Amount of Contained Appearances with Priority of Coverage on Higher-Rank Pages FIG. 7 is an example of a screen indicating a result of performing sorting in order of an amount of contained appearances with priority of coverage on higher-rank pages in a second comparative example. A screen G3 of FIG. 7 indicates a result of performing sorting with priority of a morpheme contained in all of the top three web pages and in descending order of the numbers of contained appearances in the top three web pages. In comparison between the numbers of contained appearances of for morphemes in the top three web pages and the numbers of appearances of the morphemes contained in bottom three web pages, a difference is somewhat unclear, because the morphemes are also contained in the bottom three web pages.

<Sorting according to Evaluation Score of Word of Interest A>

Figure 8:
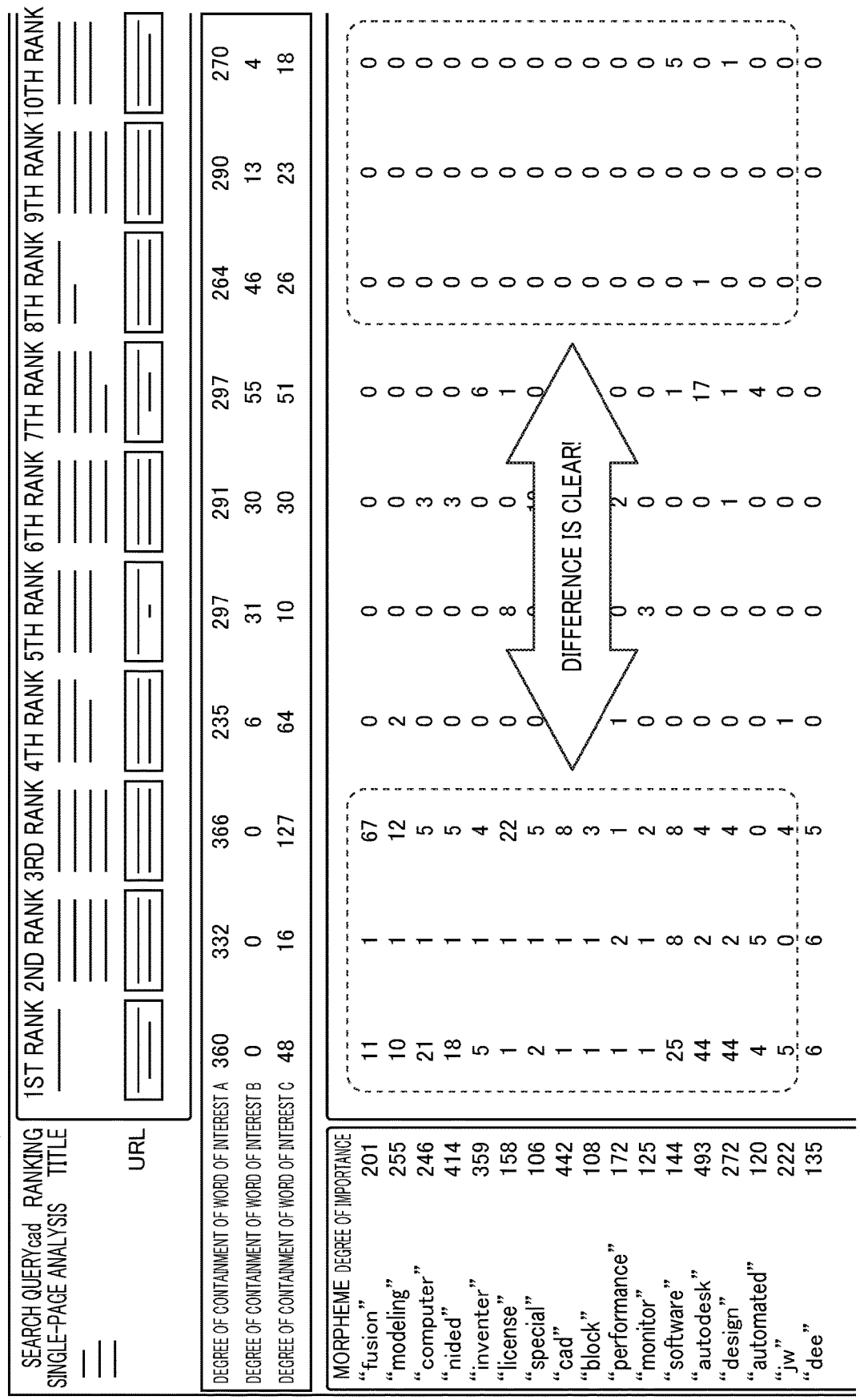
FIG. 8 is an example of a screen indicating a result of performing sorting according to an evaluation score of a word of interest A.

FIG. 8 is an example of a screen indicating a result of sorting morphemes according to an evaluation score of the word of interest A. In comparison between the numbers of appearances of the morpheme contained in top three web pages and the numbers of appearances of the morpheme contained in bottom three web pages, a difference is clear, because most of the numbers of appearances of the morpheme contained in the bottom three web pages are zero. As described above, in the case of sorting according to the word of interest A, a morpheme that is contained in higher-rank pages but is not contained on lower-rank pages can be extracted, and therefore a morpheme that causes an increase in search ranking can be grasped.

Figure 9A:
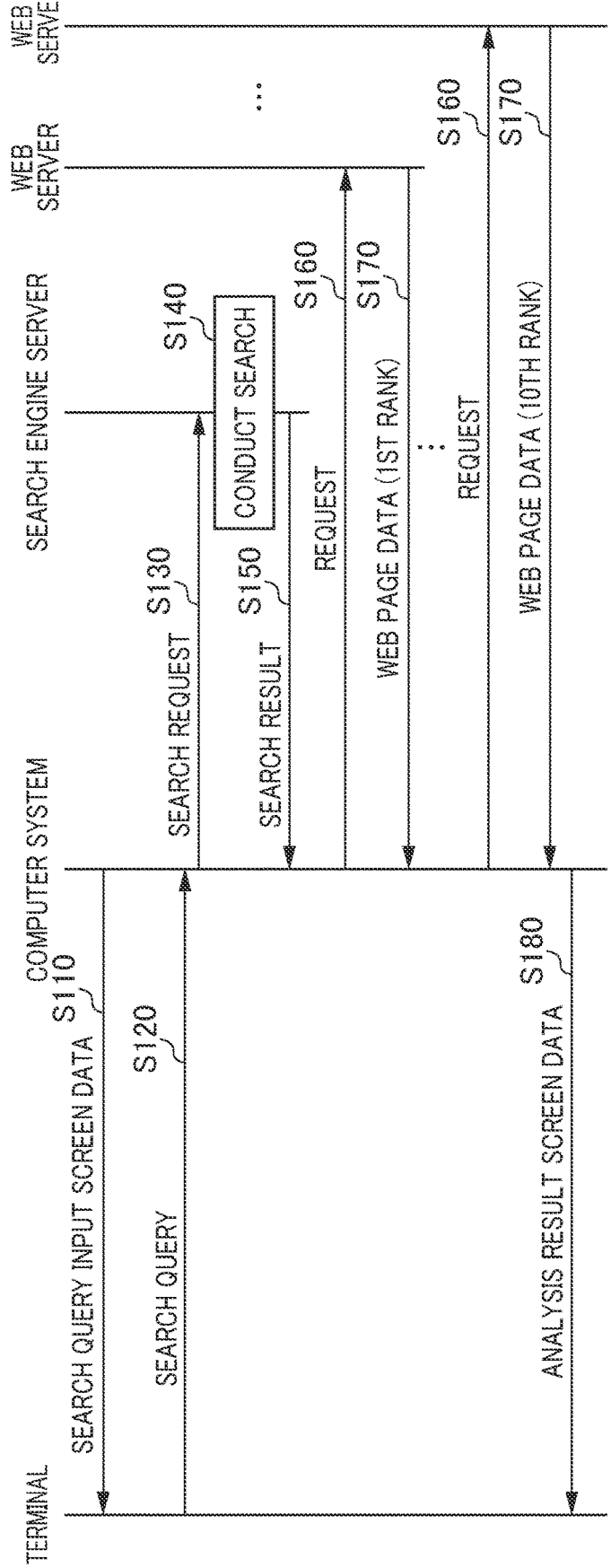
FIG. 9A is a sequence diagram illustrating an example of common processing before sorting.

FIG. 9A is a sequence diagram illustrating an example of common processing before sorting.

(Step S110) The computer system 2 transmits search query input screen data to the terminal 1 in response to a request from the terminal 1. As a result of this, a search query input screen is displayed in the terminal 1.

(Step S120) Next, the terminal 1 transmits, to the computer system 2, a search query that has been input by a user on the search query input screen.

(Step S130) Next, the computer system 2 transmits a search request together with the search query to the search engine server 3.

(Step S140) The search engine server 3 receives the search request together with the search query, and conducts a search by using the search query in response to the search request.

(Step S150) The search engine server 3 transmits a search result to the computer system 2.

(Step S160) The computer system 2 receives the search result, and sequentially transmits, to the communication circuit network CN, an HTTP request addressed to, for example, each of the uniform resource locators (URLs) that rank first to tenth in the search result.

(Step S170) A web server that has received each of the HTTP request replies to the computer system 2 with corresponding web page data.

(Step S180) In a case where the computer system 2 has received these pieces of web page data, the computer system 2 performs counting for each morpheme contained in each web page, generates analysis result screen data, and transmits the analysis result screen data to the terminal 1. As a result of this, an analysis result screen (for example, the screen G1 of FIG. 5) is displayed in the terminal 1.

Next, processing in a case where sorting is performed according to the evaluation score of the word of interest A after the analysis result screen has been displayed is described with reference to FIG. 9B. FIG. 9B is a sequence diagram illustrating an example of processing in a case where sorting is performed according to the word of interest A, after the analysis result screen has been displayed.

(Step S210) In a case where a user has selected that sorting will be performed according to the word of interest A, the terminal 1 makes a request to perform sorting according to the word of interest A.

(Step S220) The computer system 2 sorts morphemes according to the evaluation score of the word of interest A.

(Step S230) The computer system 2 transmits post-sorting-processing screen data for displaying morphemes after sorting. As a result of this, a post-sorting-processing screen is displayed in the terminal 1.

Note that the computer system 2 may transmit the order of arrangement of morphemes after sorting instead of sorting display screen data, and the terminal 1 may display the morphemes in the order of arrangement.

<Sorting Morphemes that Are Not Used on Target Web Page according to Evaluation Score of Word of Interest A>

FIG. 10 is a screen indicating a result of sorting morphemes that are not used on a target web page according to an evaluation score of the word of interest A. On a screen G5 of FIG. 10, for example, in a case where a predetermined operation (for example, right-clicking) performed by a user on a column of the target web page (here, as an example, a web page that ranks eighth in search ranking) has been received, a menu R11 for performing an operation on display of morphemes on the target web page is displayed. In the "filter" described in the menu R11, if "only not-used" has been selected, a result of sorting morphemes that are not used on the target web page according to the evaluation score of the word of interest A is displayed. Furthermore, in the "filter" described in the menu R11, if "only used" has been selected, a result of sorting morphemes that are used on the target web page according to the evaluation score of the word of interest A is displayed.

Furthermore, in the "filter" described in the menu R11, an input box (for example, a selection box) B12 for setting a minimum value of the number of times of appearance of a morpheme, and an input box (for example, a selection box) B13 for setting a maximum value of the number of times of appearance of the morpheme are displayed. In the "filter" described in the menu R11, if the minimum value and the maximum value of the number of times of appearance of the morpheme have been set, a result of sorting morphemes that are used on the target web page and for which the number of times of appearance falls under a range from the minimum value to the maximum value, according to the evaluation score of the word of interest A is displayed. In the "sorting" described in the menu R11, in a case where descending order has been selected, morphemes are displayed in descending order of the number of times of appearance on the target web page. In contrast, in the "sorting" described in the menu R11, in a case where ascending order has been selected, morphemes are displayed in ascending order of the number of times of appearance on the target web page.

On the screen G5 of FIG. 10, the filter "only not-used" of the menu R11 for the web page that ranks eighth in the search ranking has been selected, and a result of sorting morphemes that are not used on the web page that ranks eighth in the search ranking according to the evaluation score of the word of interest A is displayed. In comparison between the numbers of appearances contained in top three web pages for morphemes and the numbers of appearances contained in the web page that ranks eighth in the search ranking for the morphemes, a difference is clear.

Figure 11:
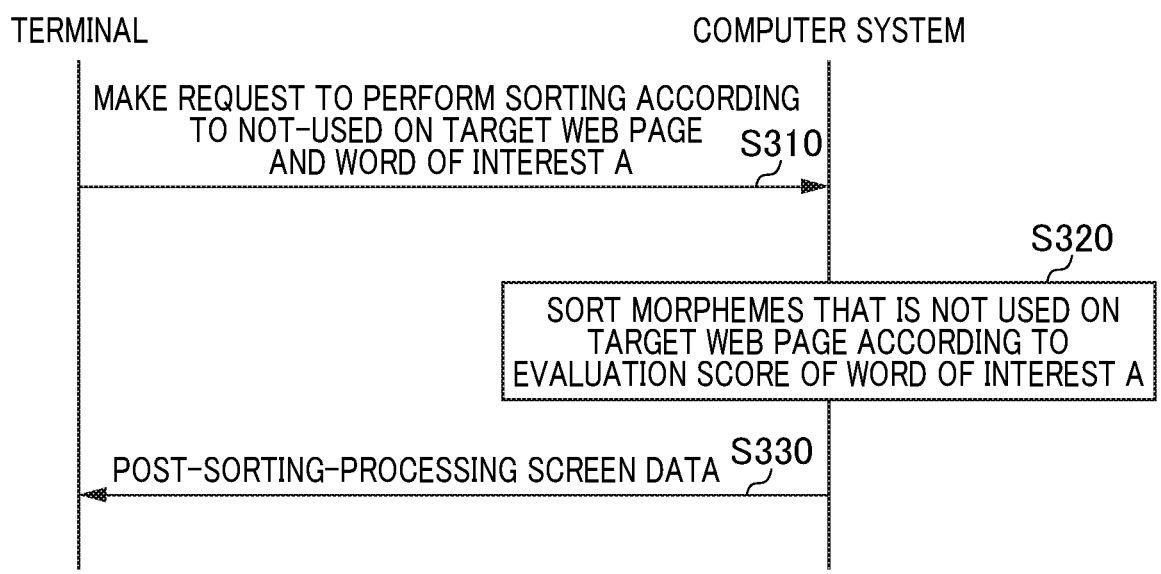
FIG. 11 is a sequence diagram illustrating an example of processing in a case where morphemes that are not used on a target web page are sorted according to the evaluation score of the word of interest A, after the analysis result screen has been displayed.

FIG. 11 is a sequence diagram illustrating an example of processing in a case where morphemes that are not used on a target web page are sorted according to the evaluation score of the word of interest A, after the analysis result screen has been displayed.

(Step S310) The terminal 1 makes a request to perform sorting according to a morpheme that is not used on a target web page and the word of interest A.

(Step S320) The computer system 2 sorts the morphemes that are not used on the target web page according to the evaluation score of the word of interest A. In order to perform this processing, the reception means 264 receives the request to perform sorting according to the morpheme that is not used on the target web page and the word of interest A, and the extraction means 261 extracts a group of words of interest A obtained by sorting the morphemes that are not used on the target web page according to the evaluation score of the word of interest A.

Note that it is preferable that sorting be performed, but sorting does not always need to be performed according to the evaluation score, and the words of interest A for which the evaluation score satisfies a reference may be extracted without sorting. Stated another way, in extracting the words of interest described above, the extraction means 261 may extract the first words of interest from among morphemes that are not used or are used on the target web page. In this case, the output means 262 may output data for displaying at least each of the extracted first words of interest.

Furthermore the output means 262 may output information for displaying the number of appearances of each of the words of interest, which are included in the extracted group of words of interest, contained in each web page. By performing this, as illustrated in FIG. 8, the number of appearances of each of the words of interest, which are included in the extracted group of words of interest, contained in each of the web pages is displayed in the terminal 1.

Furthermore, the output means 262 may output information for displaying the number of appearances of a word of interest contained in each web page, for each word of interest in a state where the words of interest have been sorted according to the numbers of appearances of the words of interest contained in higher-rank web pages. By performing this, as illustrated in FIG. 8, the number of appearances of each of the words of interest, which are included in the extracted group of words of interest, contained in each of the web pages is displayed in the terminal 1, in a state where the words of interest have been sorted according to the numbers of appearances of the words of interest contained in the higher-rank web pages.

(Step S330) The computer system 2 transmits post-sorting-processing screen data for displaying morphemes after sorting. As a result of this, a post-sorting-processing screen is displayed in the terminal 1.

Note that the computer system 2 may transmit the order of arrangement of morphemes after sorting instead of sorting display screen data, and the terminal 1 may display the morphemes in the order of arrangement.

As a result of this, for example, if the target web page is a user's web page, a morpheme that is not used on the user's web page, and causes an increase in search ranking can be grasped.

<Sorting according to Evaluation Score of Word of Interest B>

FIG. 12 is an example of a screen indicating a result of performing sorting according to an evaluation score of the word of interest B. A screen G6 of FIG. 12 indicates an example in a case where N in Formula 4 expressing score1 is 3, and the numbers of appearances of morphemes contained in top three web pages are 0. As described above, by arbitrarily setting N in Formula 4 expressing score1, an important morpheme that is not used on an arbitrary higher-rank page can be grasped.

Figure 13:
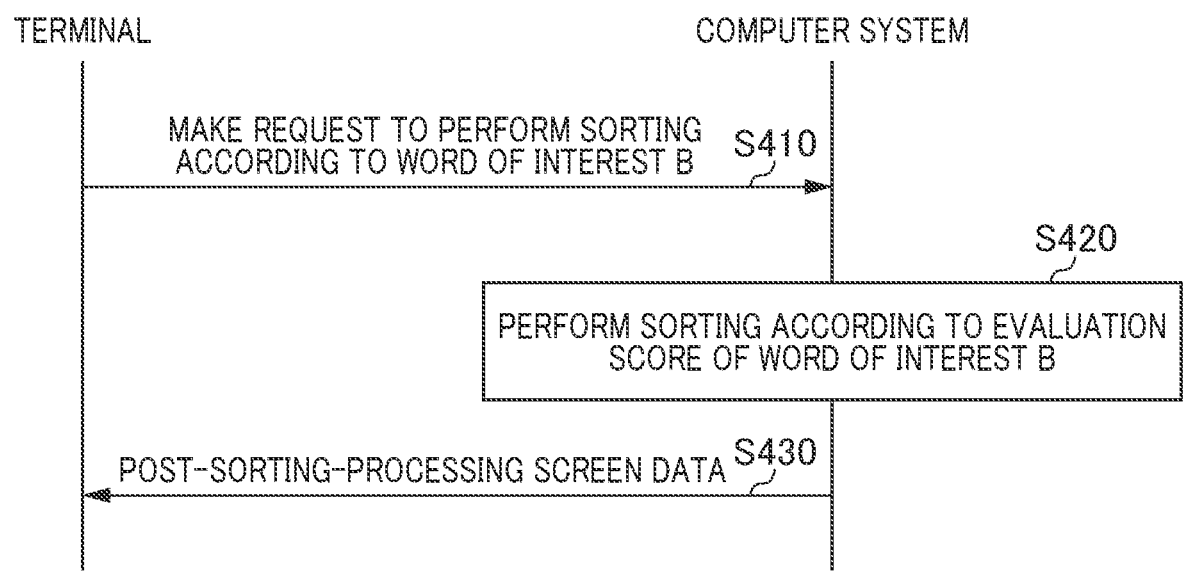
FIG. 13 is a sequence diagram illustrating an example of processing in a case where sorting is performed according to the evaluation score of the word of interest B, after the analysis result screen has been displayed.

Next, processing in a case where sorting is performed according to the evaluation score of the word of interest B after the analysis result screen has been displayed is described with reference to FIG. 13. FIG. 13 is a sequence diagram illustrating an example of processing in a case where sorting is performed according to the evaluation score of the word of interest B, after the analysis result screen has been displayed.

(Step S410) In a case where a user has selected that sorting will be performed according to the word of interest B, the terminal 1 makes a request to perform sorting according to the word of interest B.

(Step S420) The computer system 2 sorts morphemes according to the evaluation score of the word of interest B.

(Step S430) The computer system 2 transmits post-sorting-processing screen data for displaying morphemes after sorting. As a result of this, a post-sorting-processing screen is displayed in the terminal 1.

Note that the computer system 2 may transmit the order of arrangement of morphemes after sorting instead of sorting display screen data, and the terminal 1 may display the morphemes in the order of arrangement.

As a result of this, a user can grasp an important morpheme that is not used on an arbitrary higher-rank page, and therefore a morpheme that contributes to improvement in search ranking can be easily grasped.

Note that similarly to processing in the case of the word of interest A that has been described with reference to FIGS. 10 and 11, with respect to the word of interest B, a group of words of interest B may be extracted from morphemes that are not used or are used on a target web page, and may be displayed. In this case, in extracting the group of words of interest B described above, the extraction means 261 may extract the group of words of interest B from a group of morphemes that is not used or is used on the target web page. In this case, the output means 262 may output data for displaying at least each of the extracted groups of words of interest B. By employing this configuration, a group of morphemes that is not used on a target web page (for example, a web page of a company), is used less frequently on a higher-rank web pages, and has a high degree of importance relating to the search query can be grasped. Therefore, the search ranking can be efficiently increased by inserting the group of morphemes that are not used on the target web page into the target web page. Furthermore, a group of morphemes that is used on a target web page (for example, a web page of a company), is less frequently used on higher-rank web pages, and has a high degree of importance relating to the search query can be grasped. Therefore, if a small number of morphemes of a corresponding type are used on the target web page, a clue to improvement of the target web page can be provided.

As a more detailed specific example, the reception means 264 may receive a request to perform sorting according to a morpheme that is not used or is used on a target web page and the word of interest B. In this case, the extraction means 261 may extract a group of words of interest B obtained by sorting morphemes that are not used or are used on the target web page according to the evaluation score of the word of interest B. As a result of this, data for displaying the sorted group of words of interest B is output by the output means 262, and therefore the group of words of interest B is displayed in order of the evaluation score. Therefore, in a case where morphemes are not used on the target web page (for example, a web page of a company), the search ranking can be efficiently increased by inserting the morphemes into the target web page in descending order of the evaluation score. In contrast, in a case where morphemes are used on the target web page (for example, the web page of the company), if a small number of morphemes of a type having a higher evaluation score are used on the target web page, a clue to improvement of the target web page can be provided.

<Sorting according to Evaluation Score of Word of Interest C>

FIG. 14 is an example of a screen indicating a result of performing sorting according to an evaluation score of the word of interest C. A screen G7 of FIG. 14 indicates an example of morphemes that have been sorted according to the evaluation score of Formula 11. On the screen G7 of FIG. 14, morphemes appearing less frequently for themes relating to a target search query and appearing more frequently for themes other than the themes are displayed.

Figure 15:
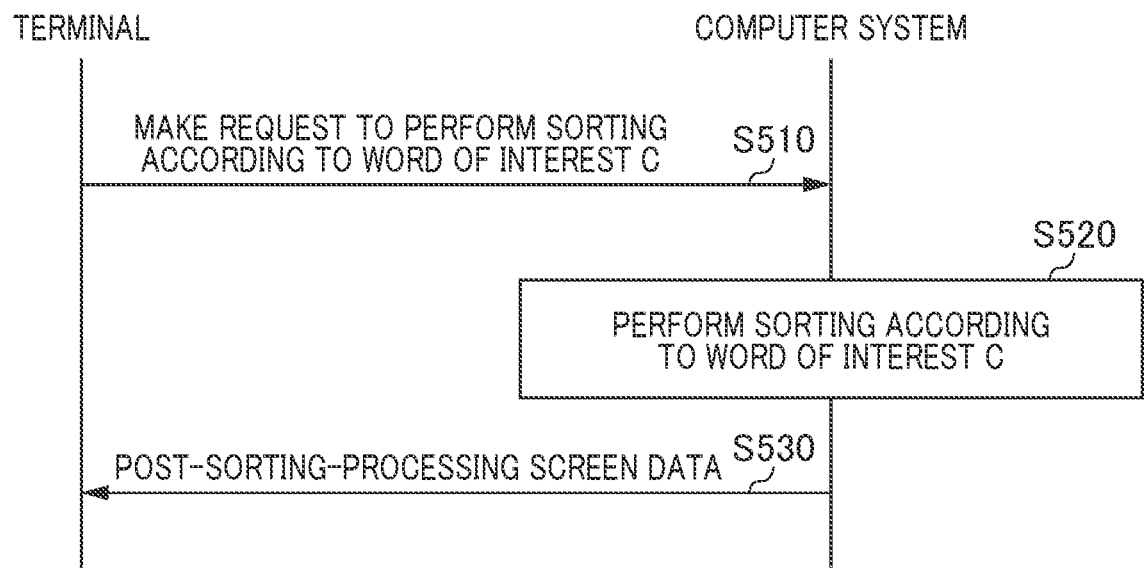
FIG. 15 is a sequence diagram illustrating an example of processing in a case where sorting is performed according to the evaluation score of the word of interest C, after the analysis result screen has been displayed.

Next, processing in a case where sorting is performed according to the evaluation score of the word of interest C after the analysis result screen has been displayed is described with reference to FIG. 15. FIG. 15 is a sequence diagram illustrating an example of processing in a case where sorting is performed according to the evaluation score of the word of interest C, after the analysis result screen has been displayed.

(Step S510) In a case where a user has selected that sorting will be performed according to the word of interest C, the terminal 1 makes a request to perform sorting according to the word of interest C.

(Step S520) The computer system 2 sorts morphemes according to the evaluation score of the word of interest C.

(Step S530) The computer system 2 transmits post-sorting-processing screen data for displaying morphemes after sorting. As a result of this, a post-sorting-processing screen is displayed in the terminal 1.

Note that the computer system 2 may transmit the order of arrangement of morphemes after sorting instead of sorting display screen data, and the terminal 1 may display the morphemes in the order of arrangement.

Note that similarly to processing in the case of the word of interest A that has been described with reference to FIGS. 10 and 11, with respect to the word of interest C, a group of words of interest C may be extracted from morphemes that are not used or are used on a target web page, and may be displayed. In this case, in extracting the group of words of interest C described above, the extraction means 261 may extract the group of words of interest C from morphemes that are not used or are used on the target web page. In this case, the output means 262 may output data for displaying at least each of the extracted groups of words of interest C. By employing this configuration, a morpheme that is used on a target web page (for example, a web page of a company), is applied less frequently on web pages having themes relating to a search query, and is applied more frequently on web pages having themes other than the themes can be grasped. This morpheme has a possibility of reduction in search ranking.

Therefore, the search ranking can be efficiently increased by excluding this group of morphemes from the target web page. Furthermore, a morpheme that is not used on a target web page (for example, a web page of a company), is applied less frequently on web pages having themes relating to a search query, and is applied more frequently on web pages having themes other than the themes can be grasped. This group of morphemes has a possibility of reduction in the search ranking. Therefore, by confirming that this group of morphemes is not used on the target web page, it can be immediately confirmed that morphemes having a possibility of reduction in the search ranking are not used.

As a more detailed specific example, the reception means 264 may receive a request to perform sorting according to a morpheme that is not used or is used on a target web page and the word of interest C. In this case, the extraction means 261 may extract a group of words of interest C obtained by sorting morphemes that are not used or are used on the target web page according to the evaluation score of the word of interest C. As a result of this, data for displaying the sorted group of words of interest C is output by the output means 262, and therefore the group of words of interest C is displayed in order of the evaluation score.

By employing this configuration, the group of words of interest C is displayed in order of the evaluation score. Therefore, a morpheme that is used on the target web page (for example, a web page of a company), is applied less frequently on web pages having themes relating to a search query, and is applied more frequently on web pages having themes other than the themes can be easily grasped. This morpheme has a possibility of reduction in search ranking. Therefore, the search ranking can be efficiently increased by excluding this group of morphemes from the target web page.

Furthermore, a morpheme that is not used on the target web page (for example, the web page of the company), is applied less frequently on web pages having themes relating to a search query, and is applied more frequently on web pages having themes other than the themes can be easily grasped. This group of morphemes has a possibility of reduction in the search ranking. Therefore, by confirming that this group of morphemes is not used on the target web page, it can be immediately confirmed that morphemes having a possibility of reduction in the search ranking are not used.

<Example of Simplification of Display of Word of Interest A>

Figure 16:
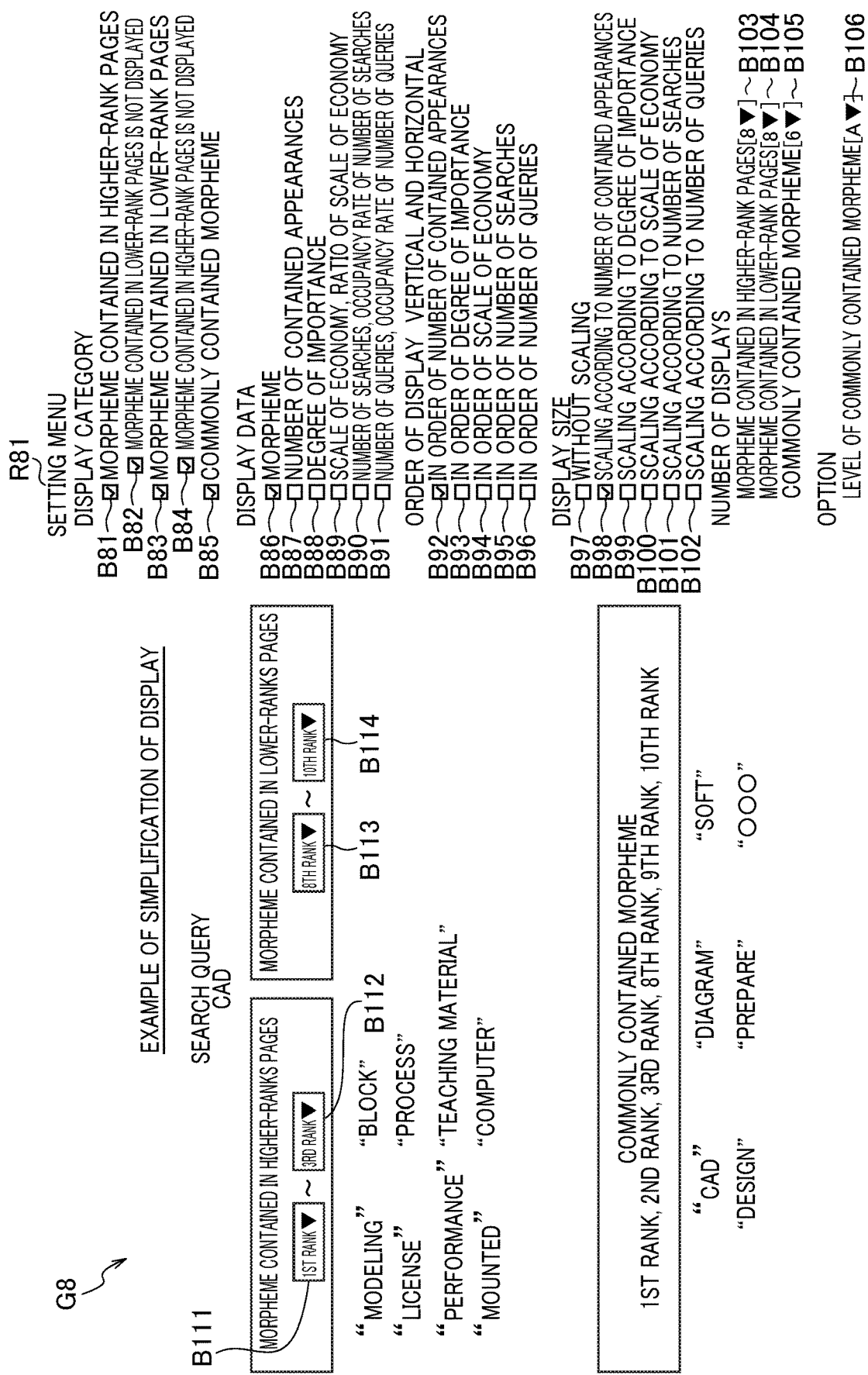
FIG. 16 is an example of a screen in which simplification has been performed on the word of interest A.

Next, an example of simplification of display of the word of interest A is described with reference to FIG. 16. FIG. 16 is an example of a screen in which simplification has been performed on the word of interest A. On a screen G8 of FIG. 16, the first rank is selected in a selection box B111, and the third rank is selected in a selection box B112. Therefore, morphemes contained in web pages of higher ranks, the first rank to the third rank, are displayed. Furthermore, here, as an example, the eighth rank is selected in a selection box B113, and the tenth rank is selected in a selection box B114. Therefore, morphemes contained in web pages of lower ranks, the eighth rank to the tenth rank, are not displayed. Morphemes that are commonly contained in web pages of higher ranks, the first rank to the third rank and web pages of lower ranks, the eighth rank to the tenth rank, are displayed.

In order to achieve this, the output means 262 outputs data for displaying a group of words of interest contained in higher-rank pages from among an extracted group of words of interest. Furthermore, the output means 262 outputs data for displaying words of interest that are commonly contained in the higher-rank web pages and the lower-rank web pages.

Note that a user may be able to select an arbitrary web page included in a search result in addition to the user's specification of a range of the search ranking, as described above. Specifically, for example, the user may be able to only select, as higher-rank web pages, web pages that rank first and third in the search ranking, and may be able to only select, as lower-rank web pages, web pages that rank eighth and tenth in the search ranking. By employing this configuration, for example, in a case where a site owned by the user is an EC site, for example, a rank that is not a competing site (for example a page of Wikipedia that ranks second) is excluded from a display target and only EC sites that rank first and third are determined to be display targets as higher-rank pages, so that a difference in morphemes from a page of the user's company that ranks lower can be displayed.

Furthermore, on the screen G8, a setting menu R81 is displayed, and a category to be displayed can be selected in a display category. Here, the setting menu R81 may be arbitrarily switched between display and non-display. Specifically, such a setting menu (also referred to as a setting panel) may be initially displayed on the screen, or the setting menu may only be displayed in a case where a predetermined operation has been performed (for example, in a case where an icon or the like has been clicked). For example, a check box B81 in which a morpheme contained in higher-rank pages can be selected as the category to be displayed, and a check box B82 in which it can be selected that a morpheme contained in lower-rank pages will not be displayed in a case where the morpheme contained in the higher-rank pages will be displayed are displayed. Furthermore, a check box B83 in which a morpheme contained in lower-rank pages can be selected as the category to be displayed, and a check box B84 in which it can be selected that a morpheme that is contained in the lower-rank pages and is contained in higher-rank pages will not be displayed are displayed. Furthermore, a check box B85 in which the display or non-display of a commonly contained morpheme can be selected is displayed.

In order to achieve this, the output means 262 outputs data in which at least one of the display or non-display of a morpheme contained in higher-rank pages, the display or non-display of a morpheme contained in lower-rank pages in a case where the morpheme contained in the higher-rank pages will be displayed, the display or non-display of a morpheme that is contained in the lower-rank pages, the display or non-display of a morpheme that is contained in the lower-rank pages and is contained in the higher-rank pages, and the display or non-display of a commonly contained word of interest can be selected. Then, the output means 262 outputs data for conducting display according to a user's selection.

On the screen G8, a check box B86 in which the display or non-display of a morpheme can be selected as display data to be displayed on the screen G8 is displayed, a check box B87 in which the display or non-display of the number of contained appearances can be selected is displayed, and a check box B88 in which the display or non-display of a degree of importance can be selected is displayed. Furthermore, a check box B89 in which the scale of economy or a ratio of the scale of economy of a target morpheme can be selected is displayed. The scale of economy of the target morpheme is a value obtained by multiplying any two or three of the number of searches (also referred to as a search volume) per unit period (for example, a month) relating to a single or a plurality of search queries that use the morpheme, a clicking unit cost of a CPC advertisement, and the competitivity of the CPC advertisement. The ratio of the scale of economy of the target morpheme (for example, "software") is a ratio of the scale of economy of the target morpheme to the total of the scales of economy of a plurality of search queries (for example, "free CAD software" or "recommended CAD") including a certain search query (for example, "CAD").

Furthermore, a check box B90 in which the number of searches or a search occupancy rate of a target morpheme can be selected is displayed. The number of searches of the target morpheme is the total of the numbers of searches (also referred to as a search volume) per unit period (for example, a month) relating to a single or a plurality of search queries that use the morpheme. For example, when the search query is "CAD", the morpheme "software" is used in many search queries such as "free CAD software" or "CAD free software". The total of the numbers of searches of the respective search queries during a unit period (for example, a month) is the number of searches for each morpheme. Furthermore, the search occupancy rate of the target morpheme is a value indicating a ratio of the total of the numbers of searches of search queries including the target morpheme described above (for example, "software") to the total of the numbers of searches of a plurality of search queries (for example, "free CAD software" or "recommended CAD") including a target search query (for example, "CAD").

Furthermore, a check box B91 in which the number of queries or an occupancy rate of the number of queries of a target morpheme can be selected is displayed. When the target search query is "CAD", there are, for example, about 1000 types of search queries including the target search query "CAD", such as "free CAD software" or "recommended CAD". The number of queries of the target morpheme is a number indicating how many types of queries are performed in which the target morpheme "software" is used together with the target search query "CAD". If the target morpheme "software" is only used, for example, in "free CAD software" and "free CAD free software", the number of queries of the target morpheme "software" is 2. The occupancy rate of the number of queries is a ratio of the number of queries of the target morpheme described above to the total of the number of types of search queries including the target search query "CAD". Note that only one of the check boxes B86 to B91 may be selected, or some of the check boxes B86 to B91 may be selected.

Furthermore, the check boxes B86 to B91 can be replaced with ratio buttons, and only one may be able to be selected.

In response to a user's selection, the output means 262 may output data for displaying, in addition to the word of interest, at least one of the number of appearances of a morpheme contained in a higher-rank page for the extracted word of interest, the degree of importance of the extracted word of interest, the scale of economy or a ratio of the scale of economy of the extracted word of interest, the number of searches or the occupancy rate of the number of searches of the extracted word of interest, and the number of queries or a query occupancy rate of the extracted word of interest.

Furthermore, a check box B92 in which it can be selected that the order of display of morphemes will be determined according to the order of the number of contained appearances is displayed. In the example of the screen G8 of FIG. 16, as an example, the check box B92 has been checked, and therefore morphemes are displayed in order of the number of contained appearances.

Furthermore, a check box B93 in which it can be selected that the order of display of morphemes will be determined according to the order of the degree of importance is displayed. Furthermore, a check box B94 in which it can be selected that the order of display of morphemes will be determined according to the order of the scale of economy is displayed. Furthermore, a check box B95 in which it can be selected that the order of display of morphemes will be determined according to the order of the number of searches is displayed. Furthermore, a check box B96 in which it can be selected that the order of display of morphemes will be determined according to the order of the number of queries is displayed. Note that only one of the check boxes B92 to B96 may be selected, or some of the check boxes B92 to B96 may be selected. In this case, morphemes may be displayed in the order of display considering a plurality of parameters.

Furthermore, the check boxes B92 to B96 can be replaced with ratio buttons, and only one may be able to be selected.

In response to a user's selection, the output means 262 may output data for displaying the extracted words of interest in order of the number of appearances contained in the higher-rank web pages, in order of the degree of importance, in order of the scale of economy, in order of the number of searches, or in order of the number of queries.

Furthermore, a check box B97 in which the display size of a morpheme can be selected in such a way that display will be conducted without scaling (stated another way, all of the morphemes will have the same size) is displayed. Furthermore, a check box B98 in which the display size of a morpheme can be selected in such a way that scaling will be performed according to the number of contained appearances of the morpheme, and display will be conducted is displayed. In the example of the screen G8 of FIG. 16, as an example, the check box B98 has been checked, and therefore the display size of a morpheme is scaled according to the number of contained appearances of the morpheme, and display is conducted. Note that only one of the check boxes B97 to B102 may be selected, or some of the check boxes B97 to B102 may be selected. In this case, scaling may be performed in consideration of a plurality of parameters. Furthermore, the check boxes B97 to B102 can be replaced with ratio buttons, and only one may be able to be selected.

In order to achieve these, the output means 262 may output data for scaling the display sizes of the extracted words of interest according to the number of contained appearances in the higher-rank web pages, the degree of importance, the scale of economy, the number of searches, or the number of queries, and conducting display.

Furthermore, a check box B99 in which the display size of a morpheme can be selected in such a way that scaling will be performed according to the degree of importance of the morpheme, and display will be conducted is displayed. Furthermore, a check box B100 in which the display size of a morpheme can be selected in such a way that scaling will be performed according to the scale of economy of the morpheme, and display will be conducted is displayed. Furthermore, a check box B101 in which the display size of a morpheme can be selected in such a way that scaling will be performed according to the number of searches of the morpheme, and display will be conducted is displayed. Furthermore, a check box B102 in which the display size of a morpheme can be selected in such a way that scaling will be performed according to the number of queries of the morpheme, and display will be conducted is displayed.

Furthermore, a selection box B103 in which the number of morphemes to be displayed that are contained in higher-rank pages can be selected is displayed. Furthermore, a selection box B104 in which the number of morphemes to be displayed that are contained in lower-rank pages can be selected is displayed. Furthermore, a selection box B105 in which the number of commonly contained morphemes to be displayed can be selected is displayed.

In order to achieve this, the output means 262 outputs data for conducting display in such a way that a user can set an upper limit of the number of words of interest to be displayed that are contained in the higher-rank web pages, an upper limit of the number of words of interest to be displayed that are contained in the lower-rank web pages, or an upper limit of the number of words of interest to be displayed that are commonly contained in the lower-rank web pages.

Furthermore, as an option, a selection box B106 in which a degree of a morpheme commonly contained in higher-rank pages and lower-rank pages can be selected is displayed. In order to achieve this, the output means 262 outputs data for conducting display in such a way that a user can set a level of containment of a word of interest commonly contained in the higher-rank web pages and the lower-rank web pages, and changes words of interest commonly contained in the higher-rank web pages and the lower-rank web pages in accordance with the set degree of containment.

<Example of Display of Usage Example of Morpheme>

Next, an example of display of a usage example of a morpheme is described with reference to FIG. 17. FIG. 17 is an example of a screen indicating an example of display of a usage example of morphemes on higher-rank pages. On the screen G9 of FIG. 17, part or the entirety of sentences that include each morpheme is extracted from each web page, and is displayed.

In order to achieve this, the character string extraction means 263 extracts, as a character string, a corresponding word of interest together with at least one or more characters before and/or after appearance of the word of interest, from a higher-rank web page. Then, the output means 262 outputs data for displaying the extracted character string. In this case, the output means 262 outputs data in such a way that display is conducted in an aspect visually different from an aspect of another character string (for example, the color of characters is changed, the thickness of characters is changed, and/or the color of a background of characters is changed) in such a way that a user easily identifies a morpheme.

As a result of this, it can be displayed which context an important morpheme is used on the higher-rank page in. Therefore, a user refers to this context, and therefore the user easily creates new sentences including the important morpheme on the user's page (for example, a page of the user's company), and easily adds the sentences including the important morpheme.

Note that in the embodiment described above, the computer system 2 receives sorting conditions (for example, any of the words of interest A, B, and C, or the like) from the terminal 1, performs processing according to these sorting conditions, and transmits data including table data or the order or arrangement of morphemes as a result to the terminal 1, but this is not restrictive. The table data may be received by the terminal 1, and the terminal 1 may perform the entirety of processing according to the sorting conditions. Furthermore, the terminal 1 may have at least one of the extraction means 261, the output means 262, and the character string extraction means 263.

As described above, an information processing system according to the present embodiment includes the extraction means 261 that extracts one group of words of interest of a group of first words of interest, a group of second words of interest, and a group of third words of interest in accordance with the first evaluation score, the second evaluation score, and the third evaluation score for each morpheme contained in character data that is posted on each web page included in a result of a search that has been conducted by a search engine by using a search query, and the output means 262 that outputs data for displaying at least the extracted group of words of interest.

By employing this configuration, in a case where the group of first words of interest has been output, as the group of first words of interest, a morpheme having a larger number of inclusion on a higher-rank web page that appears at a higher rank in the result of the search, and having a smaller number of inclusion on a lower-rank web page that appears at a lower rank in the result of the search is extracted. This enables a user to easily grasp a morpheme that contributes to improvement in search ranking.

Furthermore, in a case where the second word of interest has been output, as the group of second words of interest, a morpheme having a higher degree of importance relating to the search query than a threshold, and used less frequently on the higher-rank web page is extracted. This enables a user to easily grasp the morpheme that contributes to improvement in the search ranking.

Furthermore, in a case where the third word of interest has been output, as the third word of interest, a morpheme applied less frequently on web pages displayed in the result of the search of the search query, or other web pages that have been considered to be highly relevant to the web pages in hypertext links, a site directory, or determination in natural language processing, or applied more frequently on web pages displayed on a result of a search of another search query that has been considered to be weakly relevant, or other web pages that have been highly relevant to the web pages in hypertext links, a site directory, or determination in natural language processing is extracted. This enables a user to easily grasp a morpheme having a possibility of reduction in the search ranking.

<Score of Word of Interest A, B, or C on Web Pages>

Note that extraction means 262 may calculate, for each web page, a score indicating what degree each of the words of interest A, B, and C is satisfied to, and the output means 263 may output data for displaying the score. A position of display of the score is, for example, near the name of each of the web pages.

Here, specifically, the score may be, for example, a value obtained by simply counting a target morpheme extracted as a word of interest, a value of the count considering the number of appearances of each of the target morphemes contained in a web page, the total of the numbers of searches of search queries including the target morpheme, the total of the scales of economy of the target morpheme, or the total of the "numbers of queries of the target morpheme" described above.

<Plural-Page Analysis>

Note that an example of processing performed on a result of single-page analysis for only analyzing morphemes on a target web page has been described above, but this is not restrictive. Similar processing may be performed on a result of plural-page analysis for analyzing morphemes on pages of a link destination and a link source of the target web page in addition to the target web page.

Note that in FIGS. 5, 6, 7, 8, 10, 12, and 14, a range from the first rank to the tenth rank in search ranking is displayed as an example, but this is not restrictive. A range of display may be arbitrarily changed. Furthermore, in FIG. 17, a range from the first rank to the fifth rank in the search ranking is displayed as an example, but this is not restrictive. A range of display may be arbitrarily changed.

Note that a position of display of each element in FIGS. 5, 6, 7, 8, 10, 12, 14, and 17 is an example, and this is not restrictive. The position of display of each of the elements may be arbitrarily changed. Furthermore, in FIGS. 5, 6, 7, 8, 10, 12, 14, and 17, as an example, morphemes are displayed in a vertical direction, and the search ranking is displayed in a horizontal direction, but this is not restrictive. For example, pieces of data displayed in the vertical direction and the horizontal direction may be replaced with each other, the search ranking may be displayed in the vertical direction, and the morphemes may be displayed in the horizontal direction.

Note that at least part of the computer system 2 described in the embodiment described above may be configured by hardware, or may be configured by software. In a case where at least part of the computer system 2 is configured by software, a program for achieving functions of at least part of the computer system 2 may be stored in a computer-readable recording medium, and a computer may be caused to read and execute the program. The recording medium is not limited to an attachable/detachable recording medium such as a magnetic disc or an optical disc, and may be a fixed type recording medium such as a hard disk device or a memory.

Furthermore, the program for achieving the functions of at least part of the computer system 2 may be distributed via a communication line (including wireless communication), such as the Internet. Moreover, the program may be distributed via a wired line or a wireless line such as the Internet or in a form stored in the recording medium, in an encrypted state, a modulated state, or a compressed state.

Moreover, one or more information devices may cause the computer system 2 to function. In a case where a plurality of information devices is used, one of the plurality of information devices may serve as a computer, and the computer may execute a predetermined program, and therefore a function may be achieved as at least one means of the computer system 2.

Furthermore, in a method invention, all of the processes (steps) may be achieved under automated control performed by a computer. Furthermore, progress in the processes may be manually controlled while each of the processes is performed by the computer. Moreover, at least some of the processes may be manually performed.

As described above, the present invention is not limited to the embodiments described above with no change, and in an implementing stage, components can be varied and embodied without departing from the gist of the embodiments. Furthermore, various inventions can be made by appropriately combining a plurality of components disclosed in the embodiments described above. For example, some components may be deleted from all of the components described in the embodiments. Moreover, components described in different embodiments may be appropriately combined.

REFERENCE SIGNS LIST

1 Terminal
11 Input interface
12 Communication module
13 Storage
14 Memory
15 Output interface
16 Processor
17 Display
2 Computer system
21 Input interface
22 Communication module
23 Storage
24 Memory
25 Output interface
26 Processor
261 Extraction means
262 Output means
263 Character string extraction means
264 Reception means
3 Search engine server

The invention claimed is:

1. An information processing system comprising:
   extraction means for extracting at least one of
      a group of first words of interest in accordance with a first evaluation score for each of morphemes that are contained in character data posted on each of web pages included in a result of a search that has been conducted by a search engine by using a search query,
      a group of second words of interest in accordance with a second evaluation score for each of the morphemes, and
      a group of third words of interest in accordance with a third evaluation score for each of the morphemes; and
   output means for outputting data for displaying at least the group of the words of interest that has been extracted, wherein
   the first evaluation score is a score that has been set to extract a morpheme for which a number of appearances contained in higher-rank web pages is larger, and the number of appearances contained in lower-rank web pages is smaller, the higher-rank web pages appearing at higher ranks in the result of the search, the lower-rank web pages appearing at lower ranks in the result of the search, the first evaluation score of the i-th morphemes "$m_i$" includes S1-1($m_i$) calculated based on a following equation (1), $$S1\text{-}1(m_i)=n(\{c_{ij}|c_{ij}=0,M\leq j<N+M\})-n(\{c_{ij}|c_{ij}=0, 1\leq j\leq N\}) \quad (1)$$

wherein "$c_{ij}$" is a number of the morphemes "$m_i$" contained in a web page that ranks j-th,
{x|C(c)} is a set of elements x that satisfy condition C(x), and
n(A) indicates a number of elements of set A,
the second evaluation score is a score that has been set to extract a morpheme used less frequently on the higher-rank web pages, but having a higher peculiarity relating to the search query, the second evaluation score of the i-th morphemes "$m_i$" includes whether the peculiarity of the morphemes "$m_i$" exceeds a threshold and S2-1($m_i$) calculated based on a following equation (2), $$S2\text{-}1(m_i)=n(\{c_{ij}|c_{ij}=0,1\leq j\leq N\}) \quad (2)$$

wherein {x|C(c)} is a set of elements x that satisfy condition C(x), and
n(A) indicates a number of elements of set A, and
the third evaluation score is a score that has been set to extract a morpheme appearing less frequently on web pages having themes relating to the search query, and appearing more frequently on web pages having themes other than the themes, the third evaluation score of the i-th morphemes "$m_i$" includes S3($m_i$) calculated based on a following equation (3), $$S3(m_i)=(g_i-C_g)/(s_i-C_s) \quad (3)$$

wherein "$g_i$" is a degree of generality, "$s_i$" the peculiarity, and "$C_g$" and "$C_s$" are constants,
wherein the group of third words of interest corresponds to the third evaluation score and includes at least one morpheme appearing less frequently on web pages having themes relating to the search query, and appearing more frequently on web pages having themes other than the themes.

2. An information processing method comprising:
an extraction process of extracting at least one of
  a group of first words of interest in accordance with a first evaluation score for each of morphemes that are contained in character data posted on each of web pages included in a result of a search that has been conducted by a search engine by using a search query,
  a group of second words of interest in accordance with a second evaluation score for each of the morphemes, and
  a group of third words of interest in accordance with a third evaluation score for each of the morphemes; and
an output process of outputting data for displaying at least the group of the words of interest that has been extracted, wherein
  the first evaluation score is a score that has been set to extract a morpheme for which a number of appearances contained in higher-rank web pages is larger, and the number of appearances contained in lower-rank web pages is smaller, the higher-rank web pages appearing at higher ranks in the result of the search, the lower-rank web pages appearing at lower ranks in the result of the search, the first evaluation score of the i-th morphemes "$m_i$" includes S1-1($m_i$) calculated based on a following equation (1), $$S1\text{-}1(m_i)=n(\{c_{ij}|c_{ij}=0,M\leq j<N+M\})-n(\{c_{ij}|c_{ij}=0, 1\leq j\leq N\}) \quad (1)$$

wherein "$c_{ij}$" is a number of the morphemes "$m_i$" contained in a web page that ranks j-th,
{x|C(c)} is a set of elements x that satisfy condition C(x), and
n(A) indicates a number of elements of set A,
the second evaluation score is a score that has been set to extract a morpheme used less frequently on the higher-rank web pages, but having a higher peculiarity relating to the search query, the second evaluation score of the i-th morphemes "$m_i$" includes whether the peculiarity of the morphemes "$m_i$" exceeds a threshold and S2-1($m_i$) calculated based on a following equation (2), $$S2\text{-}1(m_i)=n(\{c_{ij}|c_{ij}=0,1\leq j\leq N\}) \quad (2)$$

wherein {x|C(c)} is a set of elements x that satisfy condition C(x), and
n(A) indicates a number of elements of set A, and
the third evaluation score is a score that has been set to extract a morpheme appearing less frequently on web pages having themes relating to the search query, and appearing more frequently on web pages having themes other than the themes, the third evaluation score of the i-th morphemes "$m_i$" includes S3($m_i$) calculated based on a following equation (3), $$S3(m_i)=(g_i-C_g)/(s_i-C_s) \quad (3)$$

wherein "$g_i$" is a degree of generality, "$s_i$" the peculiarity, and "$C_g$" and "$C_s$" are constants,
wherein the group of third words of interest corresponds to the third evaluation score and includes at least one morpheme appearing less frequently on web pages having themes relating to the search query, and appearing more frequently on web pages having themes other than the themes.

3. A non-transitory computer readable medium storing a program for causing a computer to perform:
an extraction process of extracting at least one of
  a group of first words of interest in accordance with a first evaluation score for each of morphemes that are contained in character data posted on each of web pages included in a result of a search that has been conducted by a search engine by using a search query,
  a group of second words of interest, and a group of third words of interest in accordance with a third evaluation score for each of the morphemes; and
an output process of outputting data for displaying at least the group of the words of interest that has been extracted, wherein
  the first evaluation score is a score that has been set to extract a morpheme for which a number of appearances contained in higher-rank web pages is larger, and the number of appearances contained in lower-rank web pages is smaller, the higher-rank web pages appearing at higher ranks in the result of the search, the lower-rank web pages appearing at lower ranks in the result of the search, the first evaluation score of the i-th morphemes "$m_i$" includes S1-1($m_i$) calculated based on a following equation (1), $$S1\text{-}1(m_i)=n(\{c_{ij}|c_{ij}=0, M\leq j<N+M\})-n(\{c_{ij}|c_{ij}=0, 1\leq j\leq N\}) \quad (1)$$

wherein "$c_{ij}$" is a number of the morphemes "$m_i$" contained in a web page that ranks j-th, $\{x|C(c)\}$ is a set of elements x that satisfy condition C(x), and n(A) indicates a number of elements of set A, the second evaluation score is a score that has been set to extract a morpheme used less frequently on the higher-rank web pages, but having a higher peculiarity relating to the search query, the second evaluation score of the i-th morphemes "$m_i$" includes whether the peculiarity of the morphemes "$m_i$" exceeds a threshold and S2-1($m_i$) calculated based on a following equation (2), $$S2\text{-}1(m_i)=n(\{c_{ij}|c_{ij}=0,1\leq j\leq N\}) \quad (2)$$

wherein $\{x|C(c)\}$ is a set of elements x that satisfy condition C(x), and n(A) indicates a number of elements of set A, and the third evaluation score is a score that has been set to extract a morpheme appearing less frequently on web pages having themes relating to the search query, and appearing more frequently on web pages having themes other than the themes, the third evaluation score of the i-th morphemes "$m_i$" includes S3($m_i$) calculated based on a following equation (3), $$S3(m_i)=(g_i-C_g)/(s_i-C_s) \quad (3)$$

wherein "$g_i$" is a degree of generality, "$s_i$" the peculiarity, and "$C_g$" and "$C_s$" are constants, wherein the group of third words of interest corresponds to the third evaluation score and includes at least one morpheme appearing less frequently on web pages having themes relating to the search query, and appearing more frequently on web pages having themes other than the themes.

4. The information processing system according to claim 1, wherein the extraction means extracts the group of first words of interest in accordance with the first evaluation score.

5. The information processing system according to claim 4, wherein the extraction means extracts a first number of morphemes in descending order of S1-1($m_i$) as the group of first words of interest.

6. The information processing system according to claim 4, wherein the first evaluation score includes, in addition to S1-1($m_i$), S1-2($m_i$) calculated based on a following equation (4), $$S1\text{-}2(m_i)=\Sigma_{j=1}^{N}w_h(j)f(c_{ij})-\Sigma_{j=M}^{M+N-1}w_l(j)f(c_{ij}) \quad (4)$$

wherein "$f(c_{ij})$" is an evaluation function of "$c_{ij}$",

"wh(j)" is a weight which decreases as j is smaller, and

"wl(j)" is a weight which increases as j is larger.

7. The information processing system according to claim 6, wherein the extraction means sets a rank for each of the morphemes in a descending order of S1-1($m_i$), in a case where a plurality of morphemes has an identical value of S1-1($m_i$), sets the rank for the morphemes in a descending order of S1-2($m_i$), and extracts a first number of morphemes in descending order of the rank as the group of first words of interest.

8. The information processing system according to claim 6, wherein the evaluation function is a logarithmic function of "$c_{ij}$".

9. The information processing system according to claim 6, wherein the first evaluation score includes, in addition to S1-1($m_i$) and S1-2($m_i$), S1-3($m_i$) calculated based on a following equation (5), $$S1\text{-}3(m_i)=f(c_{ij})-f(c_{ik}) \quad (5),$$

wherein $k=j+1$.

10. The information processing system according to claim 9, wherein the extraction means sets a rank for each of the morphemes in a descending order of S1-1($m_i$), in a case where a plurality of morphemes has an identical value of S1-1($m_i$), sets the rank for the morphemes in a descending order of S1-2($m_i$), in a case where a plurality of morphemes has an identical value of S1-2($m_i$), sets the rank for the morphemes in a descending order of S1-3($m_i$), and extracts a first number of morphemes in descending order of the rank as the group of first words of interest.

11. The information processing system according to claim 1, wherein the extraction means extracts the group of second words of interest in accordance with the second evaluation score.

12. The information processing system according to claim 11, wherein the extraction means sets rank for the morphemes having the peculiarity exceeding the threshold in a descending order of S2-1($m_i$), and extracts a second number of the morphemes in a descending order of the rank as the group of second words of interest.

13. The information processing system according to claim 11, wherein the second evaluation score includes, in addition to S2-1($m_i$), S2-2j($m_i$) calculated based on a following equation (6), $$S2\text{-}2j(m_i)=0 (\text{if } c_{ij}>0)$$

$$=1 (\text{if } c_{ij}=0) \quad (6).$$

14. The information processing system according to claim 13, wherein the extraction means sets a rank for each of the morphemes having the peculiarity exceeding the threshold in a descending order of S2-1($m_i$), in a case where a plurality of morphemes has an identical value of S2-1($m_i$), sets the rank for the morphemes in a descending order of S2-2j($m_i$), and extracts a second number of morphemes in descending order of the rank as the group of second words of interest.

15. The information processing system according to claim 13, wherein the second evaluation score includes, in addition to S2-1($m_i$) and S2-2j($m_i$), S2-3($m_i$) calculated based on a following equation (7), $$S2\text{-}3(m_i)=-\Sigma_{j=1}^{N}w(j)f(c_{ij}) \quad (7)$$

wherein "w(j)" is a weight which increases as j is smaller.

16. The information processing system according to claim 15, wherein the extraction means sets a rank for each of the morphemes having the peculiarity exceeding the threshold in a descending order of S2-1($m_i$), in a case where a plurality of morphemes has an identical value of S2-1($m_i$), sets the rank for the morphemes in a descending order of S2-2j($m_i$), in a case where a plurality of morphemes has an identical value of S2-2j($m_i$), sets the rank for the morphemes in a descending order of S2-3($m_i$), and extracts a second number of morphemes in descending order of the rank as the group of second words of interest.

17. The information processing system according to claim 15, wherein the extraction means
sets a rank for each of the morphemes having the peculiarity exceeding the threshold in a descending order of S2-1($m_i$),
in a case where a plurality of morphemes has an identical value of S2-1($m_i$), sets the rank for the morphemes in a descending order of S2-2j($m_i$),
in a case where a plurality of morphemes has an identical value of S2-2j($m_i$), sets the rank for the morphemes in a descending order of S2-3($m_i$),
in a case where a plurality of morphemes has an identical value of S2-3 ($m_i$), sets the rank for the morphemes in a descending order of the peculiarity, and
extracts a second number of morphemes in descending order of the rank as the group of second words of interest.

18. The information processing system according to claim 11, wherein the peculiarity $s_i$ of the morphemes $m_i$ is expressed by following equations (8a) to (8c), $$s_{ij} = p(w_i, m_j) * \log \frac{1}{p(W, m_j)} \tag{8a}$$

$$p(w_i, m_j) = \frac{n_{ij}}{N} \tag{8b}$$

$$p(w_i, m_j) = \frac{\sum_i n_{ij}}{\sum_i N}, \tag{8c}$$

wherein "$n_{ji}$" is a number of web pages in which the morphemes "$m_i$" is contained among the web pages having 1st to N-th search ranks to a search word "$w_i$".

19. The information processing system according to claim 1, wherein the extraction means extracts the group of third words of interest in accordance with the third evaluation score.

20. The information processing system according to claim 1, wherein outputting the data comprises filtering at least one extracted morpheme based on the peculiarity.

21. The information processing system according to claim 1, wherein the output means outputs data for displaying, in addition to each of the words of interest, the peculiarity of each of the words of interest that have been extracted.

22. The information processing system according to claim 1, wherein
the extraction means extracts the group of first words of interest, the group of second words of interest, and the group of third words of interest, and
the output means outputs data for displaying, in addition to each of the words of interest, a degree of containment of the group of the first words of interest, a degree of containment of the group of the second words of interest, and a degree of containment of the group of the third words of interest that have been extracted for each of the web pages.

* * * * *